(12) United States Patent
Wynalda, Jr.

(10) Patent No.: US 11,712,038 B2
(45) Date of Patent: Aug. 1, 2023

(54) BREATH-POWERED SCENT DISTRIBUTION HUNTING MASK

(71) Applicant: WYNDSCENT, LLC, Belmont, MI (US)

(72) Inventor: Robert M. Wynalda, Jr., Comstock Park, MI (US)

(73) Assignee: Wyndscent, LLC, Belmont, MI (US)

( * ) Notice: Subject to any disclaimer, the term of this patent is extended or adjusted under 35 U.S.C. 154(b) by 936 days.

(21) Appl. No.: 16/678,939

(22) Filed: Nov. 8, 2019

(65) Prior Publication Data

US 2020/0093121 A1    Mar. 26, 2020

Related U.S. Application Data

(63) Continuation of application No. 15/376,431, filed on Dec. 12, 2016, now Pat. No. 10,499,635, which is a continuation-in-part of application No. 15/137,261, filed on Apr. 25, 2016, now Pat. No. 9,894,893, and a continuation-in-part of application No. 15/137,677, filed on Apr. 25, 2016, now Pat. No. 9,585,981.

(60) Provisional application No. 62/298,913, filed on Feb. 23, 2016, provisional application No. 62/290,743, filed on Feb. 3, 2016, provisional application No. 62/286,221, filed on Jan. 22, 2016, provisional application No. 62/276,121, filed on Jan. 7, 2016, provisional application No. 62/275,559, filed on Jan. 6, 2016, provisional application No. 62/266,391, filed on Dec. 11, 2015.

(51) Int. Cl.
*A01M 31/00* (2006.01)
*A41D 13/11* (2006.01)
*A62B 9/02* (2006.01)
*A62B 7/10* (2006.01)

(52) U.S. Cl.
CPC ........ *A01M 31/004* (2013.01); *A01M 31/008* (2013.01); *A41D 13/11* (2013.01); *A62B 7/10* (2013.01); *A62B 9/02* (2013.01); *A41D 2600/108* (2013.01)

(58) Field of Classification Search
CPC .. A01M 31/00; A01M 31/004; A01M 31/008; A41D 13/11; A41D 2600/108; A62B 7/10; A62B 9/02
USPC ................ 392/386, 390, 391, 394, 398–406; 128/206.22, 206.26
See application file for complete search history.

(56) References Cited

U.S. PATENT DOCUMENTS

| | | |
|---|---|---|
| 5,117,821 A | 6/1992 | White |
| 5,269,294 A | 12/1993 | Rogozinski |
| 5,697,105 A | 12/1997 | White |
| 6,070,578 A | 6/2000 | Baughman et al. |

(Continued)

*Primary Examiner* — Dana Ross
*Assistant Examiner* — James F Sims, III
(74) *Attorney, Agent, or Firm* — Fred Zullinger

(57) ABSTRACT

Device embodiments use a person's exhaled breath to distribute an evaporated, sublimated, or vaporized material. The disclosure provides non-powered devices that use evaporation or sublimation to create the vapor that is distributed and the disclosure provides devices with electric vaporizers which rapidly vaporize liquid scent materials for distribution. The scent can be designed as a masking or cover scent, an aromatic lure scent, a scent elimination material, a pleasant scent for freshening air in a room or automobile, or a repellant scent. The device can be worn as a mask or configured as a game call.

18 Claims, 23 Drawing Sheets

(56) References Cited

U.S. PATENT DOCUMENTS

| | | |
|---|---|---|
| 6,805,124 B2 | 10/2004 | Japuntich et al. |
| 7,004,167 B2 | 2/2006 | Cheng |
| 8,412,029 B2 * | 4/2013 | Browder .................. A61L 9/03 |
| | | 392/386 |
| 8,490,889 B2 * | 7/2013 | Rydbom .................. A61L 9/12 |
| | | 239/37 |
| 9,067,086 B2 | 6/2015 | Danford |
| 9,770,057 B2 * | 9/2017 | Duffy ................. A41D 13/1161 |
| 2005/0169854 A1 | 8/2005 | Coro |
| 2005/0191384 A1 | 9/2005 | Bretl et al. |
| 2009/0114228 A1 | 5/2009 | Kirschner |
| 2012/0272968 A1 | 11/2012 | Kirschner |

* cited by examiner

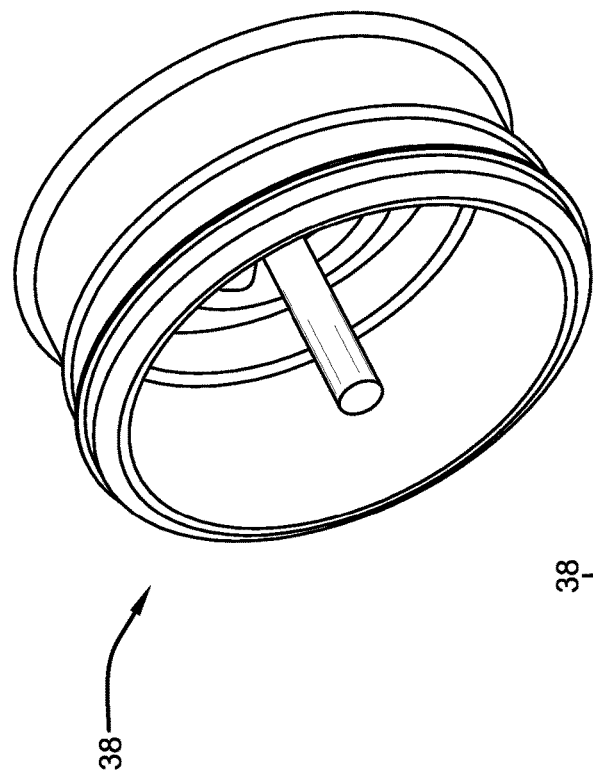
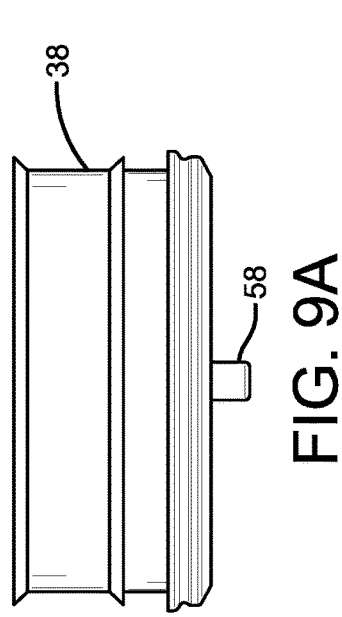
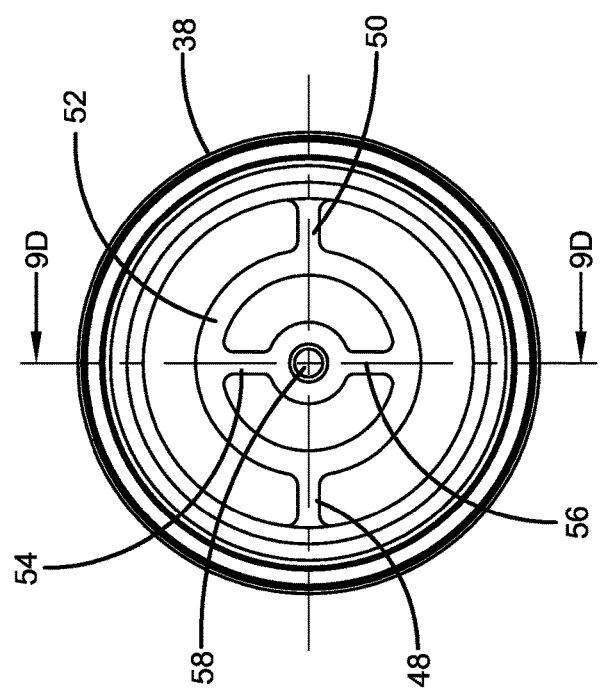

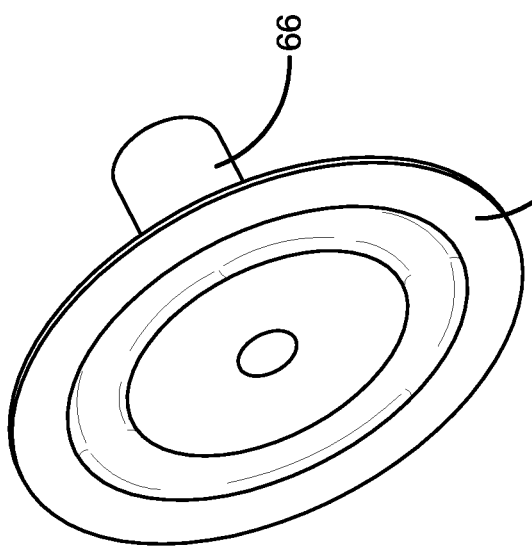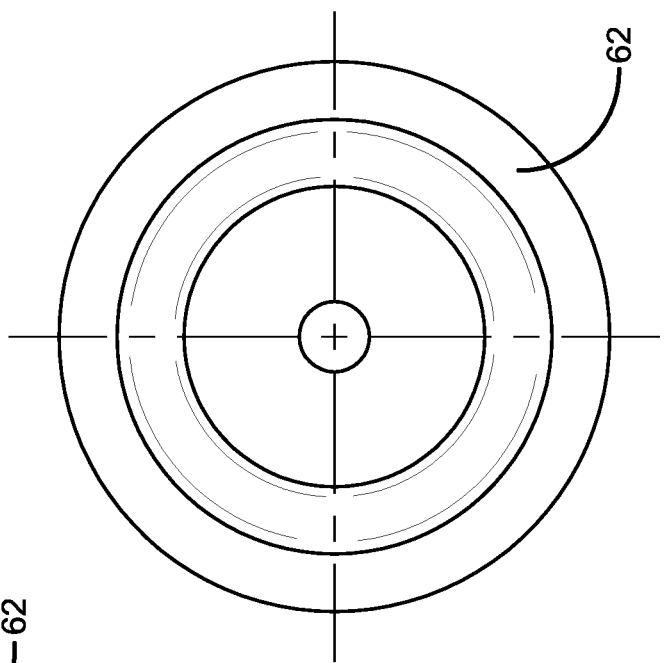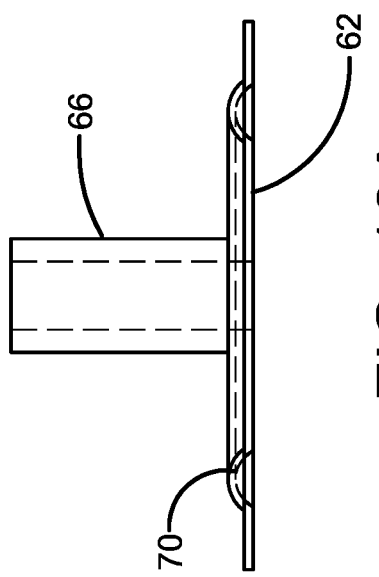

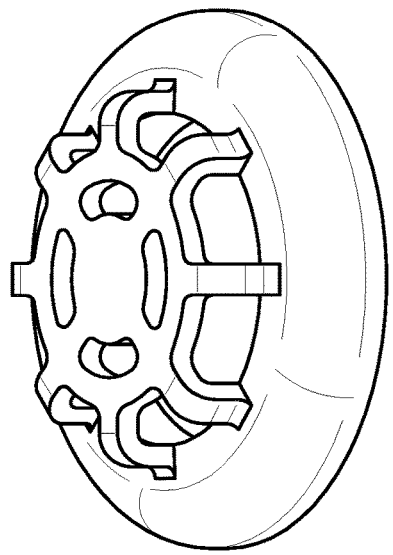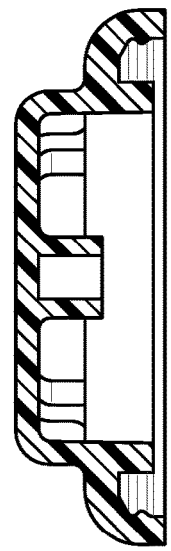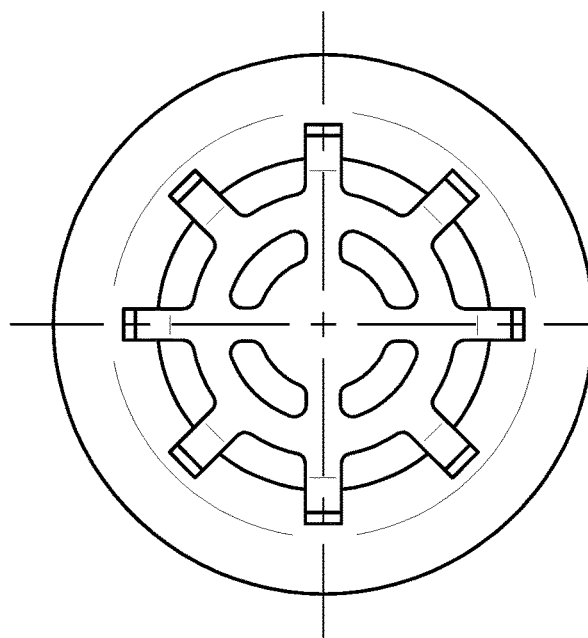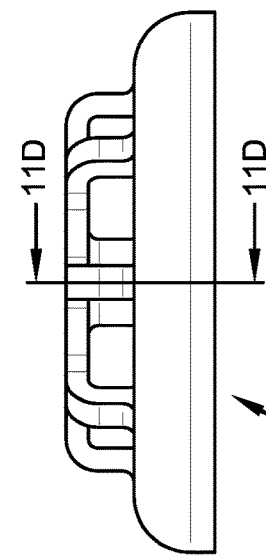
FIG. 11A
FIG. 11B
FIG. 11C
FIG. 11D

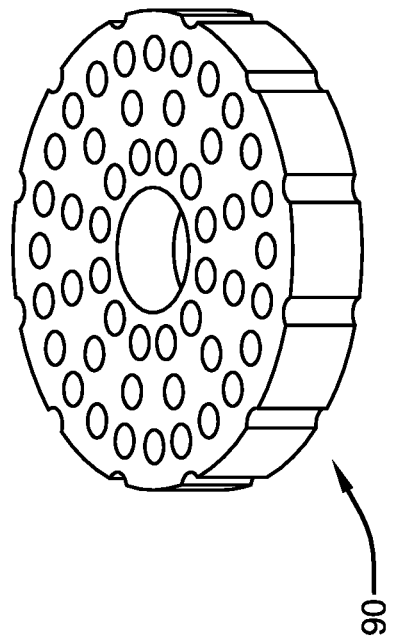
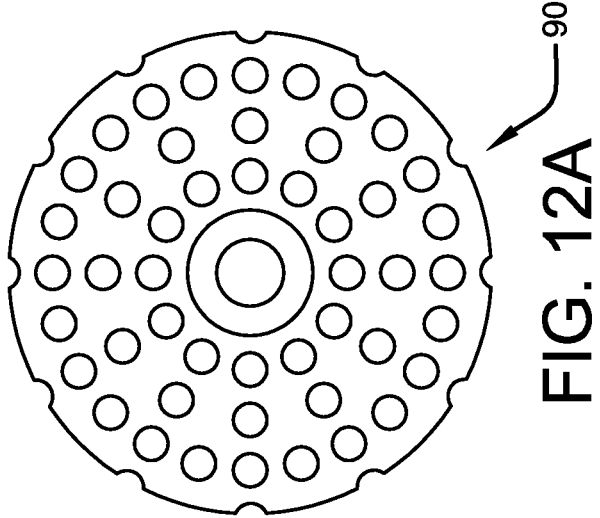
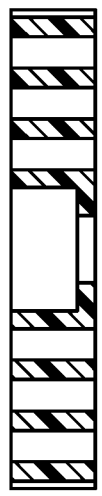
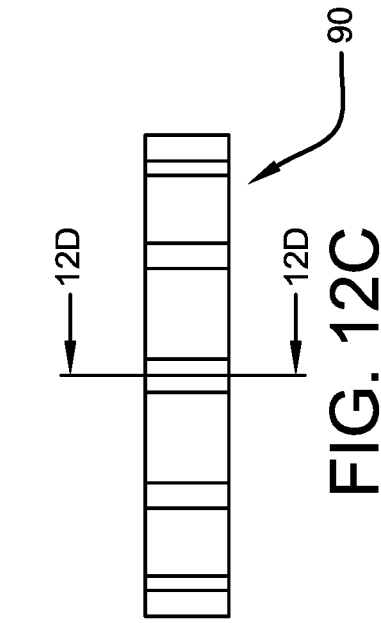

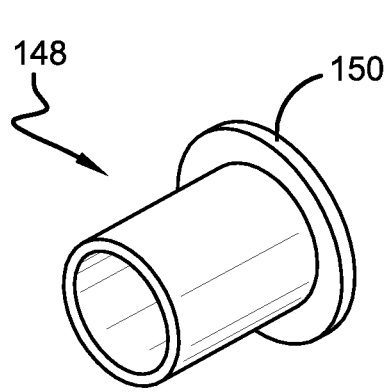
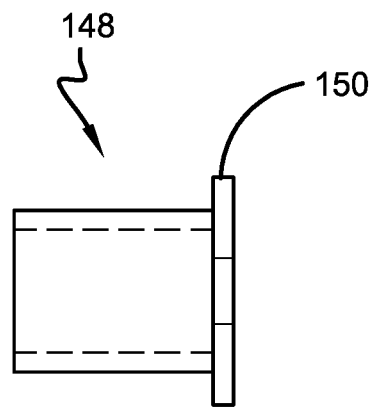
FIG. 16A   FIG. 16B
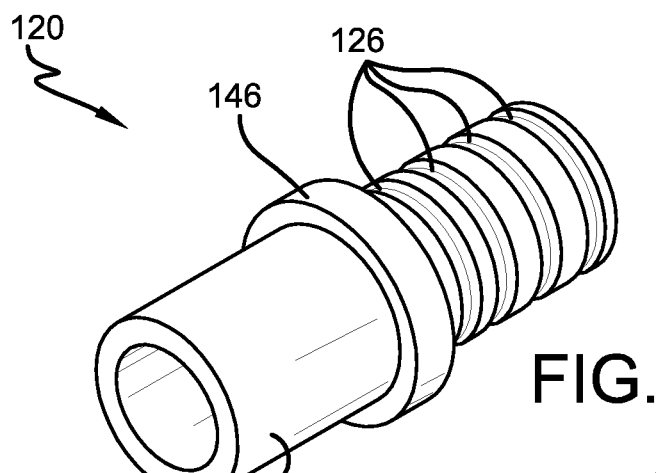
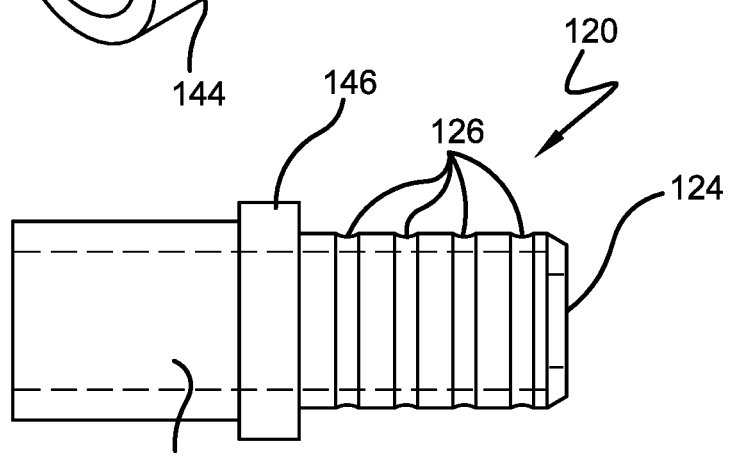
FIG. 17A
FIG. 17B

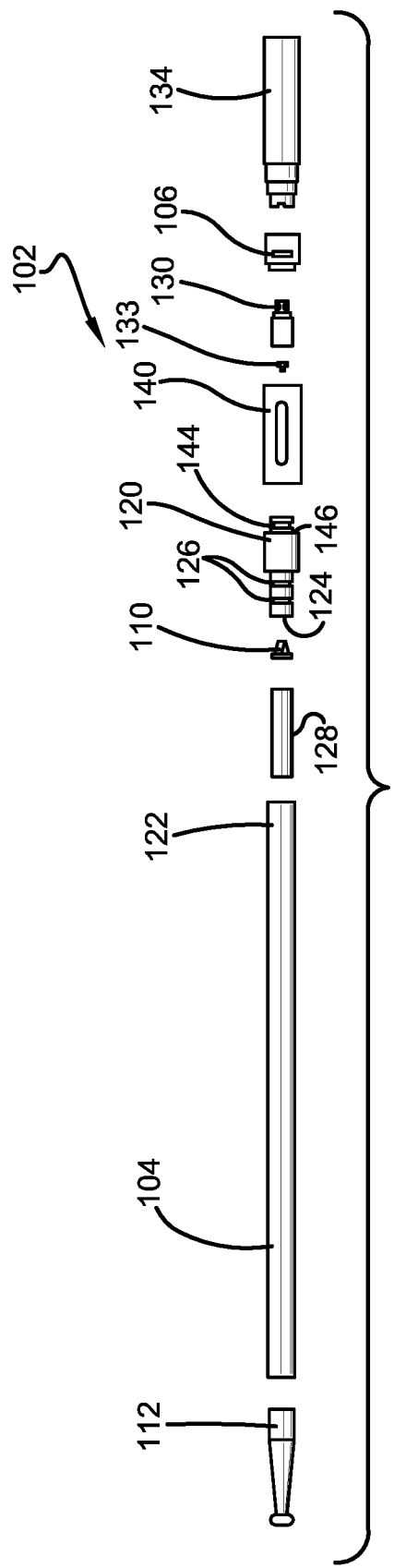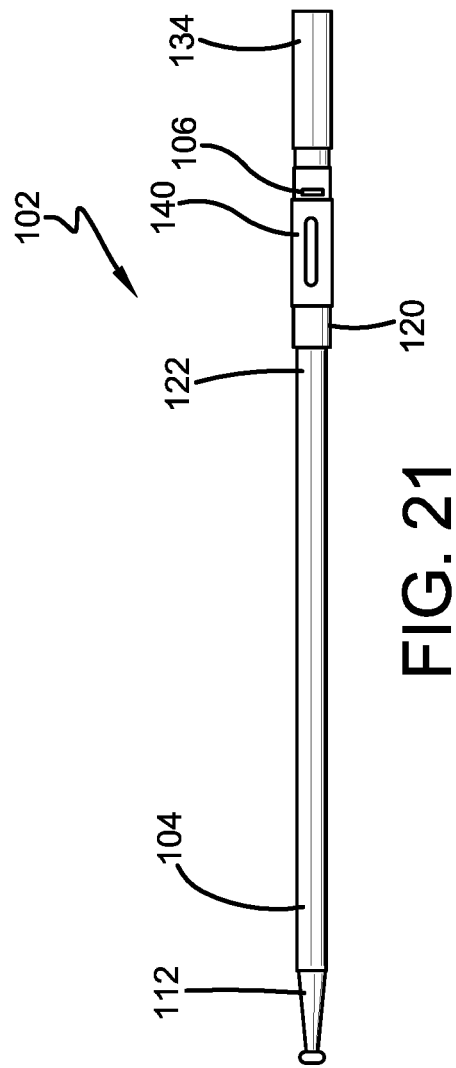

BREATH-POWERED SCENT DISTRIBUTION HUNTING MASK

CROSS REFERENCE TO RELATED APPLICATIONS

This application is a continuation application claiming priority to U.S. patent application Ser. No. 15/376,431 filed Dec. 12, 2016, which claims the benefit of U.S. Provisional Patent Application No. 62/266,391 filed Dec. 11, 2015; 62/275,559 filed Jan. 6, 2016; 62/276,121 filed Jan. 7, 2016; 62/286,221 filed Jan. 22, 2016; 62/290,743 filed Feb. 3, 2016; 62/298,913 filed Feb. 23, 2016; and which is a continuation-in-part of U.S. patent application Ser. No. 15/137,261 filed Apr. 25, 2016, now U.S. Pat. No. 9,894,893; and a continuation-in-part of U.S. patent application Ser. No. 15/137,677 filed Apr. 25, 2016, now U.S. Pat. No. 9,585,981; the disclosures of which are incorporated herein by reference.

BACKGROUND OF THE DISCLOSURE

1. Technical Field

This disclosure generally relates to apparatus and methods for creating and distributing a vapor using a person's exhalation or breath to distribute the vaporized material. More particularly, this disclosure relates to a mask worn by a human in order to use the human exhalation to distribute a masking scent. More particularly, this disclosure relates to vapor device that distributes a scent material using an airflow generated by the user's breath. The distribution device can be combined with a game call. The devices and methods of the disclosure can be used with scent materials used to attract game, scent materials used to repel game or insects, or with vaporizable materials that eliminate or substantially reduce scents given off by a person that are not desired during a hunt.

2. Background Information

Game hunters understand that game animals are sensitive to smells. Hunters will go to great lengths to eliminate and cover smells that risk compromising their presence to game animals. Although the hunter can eliminate scent from clothing and equipment, the hunter's breath can be detected by animals. When a hunter uses a game call that employs the user's breath to generate the game call sound, the hunter's scent is distributed into the air and can be detected by the animals being hunted.

Individuals who engage in activities such as hunting, photography, or studies of animals in their natural habitat are well acquainted with the difficulty in approaching wild life without alerting the wildlife to the individual's presence. Most animals have well-developed senses of sight and smell, and individuals attempting to approach wildlife in its natural habitat must camouflage their visual image and mask or eliminate their odor. One of the primary odors detected by animals is the odor carried in the exhalation of the individual.

While eliminating the odor of the wearer is important to hide the presence of the wearer, it is also important that the wearer retain the ability to detect odors in their environment. In a potentially hostile environment, individuals must maintain the fullest use of their senses.

A variety of masks are available to assist individuals to remain undetected when approaching wildlife. For example, U.S. Pat. No. 5,091,996 to Kirby discloses a camouflage face mask which is positioned in a close fitting relationship to the skin of an individual's face. While the mask disclosed by Kirby may be worn with relative comfort and enables visual concealment of the individual from nearby animals, the mask does not disclose means by which the odor of the individual is concealed from nearby wildlife. U.S. Pat. No. 5,226,189 to Blutstein and U.S. Pat. No. 4,285,068 to Ross both disclose camouflage devices suitable for wearing about the head which prevent visual detection of the hunter by nearby wildlife, but neither Ross or Blutstein address the concealment or elimination of odors contained in the exhalation of an individual so as to prevent detection of the odor of the individual by nearby wildlife.

U.S. Pat. No. 5,511,541 to Dearstine discloses a warm air mask comprising a facial covering which encompasses the nose and mouth of a wearer, the mask having a plurality of oval inhale ports which extend through the mask such that, as the wearer inhales, the inhale ports are opened. Upon subsequent exhalation by the wearer, the inhale ports close and an exhale port opens. Upon inhalation, the exhale port closes. The mask disclosed in Dearstine is directed to providing a mask which keeps the face of the wearer warm and dry, and does not eliminate odors from the exhalation of the wearer.

U.S. Pat. No. 5,269,294 to Rogozinski discloses a face mask impregnated with an odor-absorbing material which eliminates organic gaseous compounds from the air inhaled through the mask, thus reducing the gaseous foul odors inhaled through the mask, thus reducing the wearer's perception of odors. While this mask enables reduced detection of odors by the wearer, it does not provide a filtering action for reduction of odors in the exhalation of the wearer which pass into the ambient atmosphere.

U.S. Pat. No. 5,117,821 to White discloses a hunting mask with a breath odor control system which includes a face mask having a one-way air intake valve and a tube for conducting a hunter's exhalation from the mask to an intake end of an air purification canister. The air purification canister has, at its other end, a one-way discharge valve such that filtered breath may be discharged to the ambient atmosphere once odors have been removed from the exhalation. The device disclosed by White, while providing a method for filtering odors from the exhalation of a hunter or other individual, is bulky and difficult to use as the purifying canister must be attached to the wearing apparel of the individual. This causes discomfort and additional weight which the hunter or other individual must support over a potentially long period of time.

U.S. Pat. No. 5,383,236 to Sesselmann discloses a variety of articles of clothing which absorb odors emanating from the portion of the person which is substantially surrounded by the clothing, thereby preventing odors from escaping to the atmosphere for detection by nearly wildlife. In particular, Sesselmann discloses a breath shield which is intended to be placed over the nose and mouth of a wearer which may be integrated into a larger head covering. The breath shield disclosed by Sesselmann contains an odor absorbing means in the form of fibers treated with activated carbon or charcoal. All air inhaled by the wearer of the mask disclosed by Sesselmann must pass through the odor absorbing material, thereby significantly reducing the ability of the wearer to detect odors in the surrounding environment. Individuals in remote areas depend upon their sense of smell to detect odors related to the surrounding environment such as smoke, a fetid marsh or the presence of a decaying animal. The mask disclosed by Sesselmann does not permit full use of the wearer's sense of smell, thus reducing the ability of the wearer to properly function in a wilderness environment.

U.S. Pat. No. 5,697,105 to White discloses a hunting mask that eliminates odors from the exhalation of the hunter wearing the mask. Activated charcoal or carbon filters are used in the body of the mask to eliminate the odors from the exhalation.

U.S. Pat. No. 7,004,167 to Cheng discloses a mask that carries one or more aromatic capsules that can be opened to allow the person wearing the mask to smell the fragrances provided by the capsule.

Aromatic materials have long been used by individuals to lure or attract game animals toward a position desired by the individual. Examples of aromatic materials include doe urine and sweet smelling items such as apple and corn. In some cases, a hunter spreads the smell of a buck in order to lure a different buck seeking to defend territory. Other urines and gland secretions are also used as well as naturally occurring smells from trees and bushes favored by game.

Other uses for scents include cover scents and scents that repel game. Repelling scents can be used to prevent animals from entering or leaving an area.

Other situations where one desires to distribute a scent include freshening the air in a room or inside an automobile. Some scents are used to ward off insects such as citronella or picaridin used for mosquitos.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure provides a game call having a filter to substantially reduce scent from the user's breath. The filter can be disposed at the inlet or the outlet of the call. The filter can include activated carbon.

The disclosure provides a game call that distributes a scent material when used to produce sound. The scent material is distributed by the user's breath which is also used to create the sound out of the call.

The disclosure provides device embodiments that use a person's exhaled breath to distribute an evaporated, sublimated, or vaporized material. The disclosure provides non-powered devices that use evaporation or sublimation to create the vapor that is distributed and the disclosure provides devices with electric vaporizers which rapidly vaporize liquid scent materials for distribution. One configuration can be combined with a game call with a valve that allows the user to select which feature to use.

The vaporized material can be rapidly vaporized with an electric vaporizer or slowly vaporized by evaporation or sublimation. The scent can be designed as a masking or cover scent, an aromatic lure scent, a scent elimination material, a pleasant scent for freshening air in a room or automobile, or a repellant scent.

The disclosure provides one embodiment in the form of a mask wearable by a human that uses the human's exhalation to distribute a vapor scent. The mask has an exhalation valve through which substantially all of the user's exhalation exits the mask. The exhalation valve carries a material that is mixed with the wearer's exhalation. The material is carried in a manner than prevents the material from being inhaled by the wearer.

The disclosure provides a mask wearable by a human wherein the mask includes inhalation and exhalation valves. The inhalation valve allows the wearer to draw fresh air into his lungs. When the inhalation valve is open, the exhalation valve is closed. When the wearer exhales, the inhalation valve closes and the exhalation valve is pushed open by the exhalation. A masking scent carrier is disposed immediately downstream of the exhalation valve member and is immediately contacted by the exhalation as the breath flows out of the exhalation valve. The exhalation picks up the material from the material carrier and the combination is distributed into the air.

The mask embodiment also has the features of being impermeable to air other than through and out of the valves and preventing the wearer from directly inhaling the material being distributed.

The disclosure provides a scent distribution device that uses the person's breath to move vapor that is rapidly vaporized from a vaporizing coil through the outlet of the device. This disclosure also provides methods for distributing scents with the user's breath.

The disclosure provides a vaporizing and distribution device that uses an electric heating element to rapidly vaporize a scent material that is provided as a liquid to the heating element. The scent material can include a propylene glycol (PG), a vegetable glycerin (VG), a combination of PG and VG, or a combination of PG or VG and water. These substances are mixed with an aromatic, repellant, and scent elimination material that can be added as a solid or a liquid. The aromatic material can be a hunting lure or a material having a smell that is pleasant to humans or a material that repels animals or insects. The solid aromatic material can be a dehydrated material such as dehydrated animal or game urine such as a deer urine, elk urine, bear urine, or other dehydrated glandular secretions. The liquid aromatic material can be the liquid forms of these materials or scented oils.

The disclosure provides a scent material composition that includes a base that is readily vaporized by an electric resistive heater and an animal lure aromatic material which can be a dehydrated urine or an animal material such as gland secretions that attract game. Deer urine is provided as an example. The aromatic material also can be a pleasant-smelling material such as a fruit-based material, a flower-based material, or another pleasant-smelling plant or item such that the device may be used for an alternative purpose of freshening air in a room or the air in an automobile. These scents also may be used to cover the scents humans leave while entering or exiting hunting grounds.

The disclosure provides one configuration wherein the device is held up to the user's mouth to receive the exhaled breath and another configuration wherein a tube is used to position the outlet of the device away from the user's head so the air and vapor are output away from the user's head. These configuration san include a one-way valve to prevent the user from inhaling the vapor.

The disclosure provides a device having a power button that energizes the vaporizing coil. The button can be provided as a push on and push off or as an on when depressed and off when released style button. The user presses down on the button to energize the vaporizing coil to create scented vapor. The power button is used to provide an electric current to the vaporizing coil. The disclosure also provides a sensor that activates the vaporizing coil in response to the user's breath such that the user does not need to push a button to activate the device. A power source such as a battery is carried by the device.

The disclosure provides a device that holds a volume of liquid scent material that is in contact with the vaporizing coil. A wick can be used to limit the amount of liquid brought into contact with the coil and to prevent the liquid scent material from flowing or dripping out of the device.

The device can be disposable or refillable. The device can use removable and replaceable liquid tanks to allow different scents to be distributed.

Another aspect of the disclosure is a vaporizable material and method of using a vaporizable material for scent elimination. The disclosure provides a vaporizable mixture that includes a percentage of carbon, charcoal, activated carbon, or coconut shell activated carbon, or palm kernel shell charcoal or a combination of these substances. The combination of these substances with a vaporizable material such as the glycol materials discussed above allow a scent elimination substance to be generated to be used by a hunter to eliminate or reduce scents that can alert game to the hunter's presence.

The preceding non-limiting aspects, as well as others, are more particularly described below. A more complete understanding of the processes and the structures of the vaporizing device can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

FIGS. 9A-9D depict a plurality of detailed views of the exhalation valve body.

FIGS. 10A-10C depict a plurality of detailed views of the exhalation valve diaphragm.

FIGS. 11A-11D depict a plurality of detailed views of the exhalation valve cap.

FIGS. 12A-12D includes a plurality of detailed views of an exemplary exhalation valve scent carrier.

FIG. 16A is a perspective view of an insert that can carry the burner and coil used to vaporize the liquid scent material.

FIG. 16B is a side view of FIG. 16A.

FIG. 17A is a perspective view of an adapter that connects the inlet tube to the insert.

FIG. 17B is a side view of FIG. 17A.

FIG. 20 is another alternative exemplary configuration for the device of the disclosure.

FIG. 21 is a side view of FIG. 20.

Similar numbers refer to similar parts throughout the specification.

DETAILED DESCRIPTION OF THE DISCLOSURE

Figure 1:
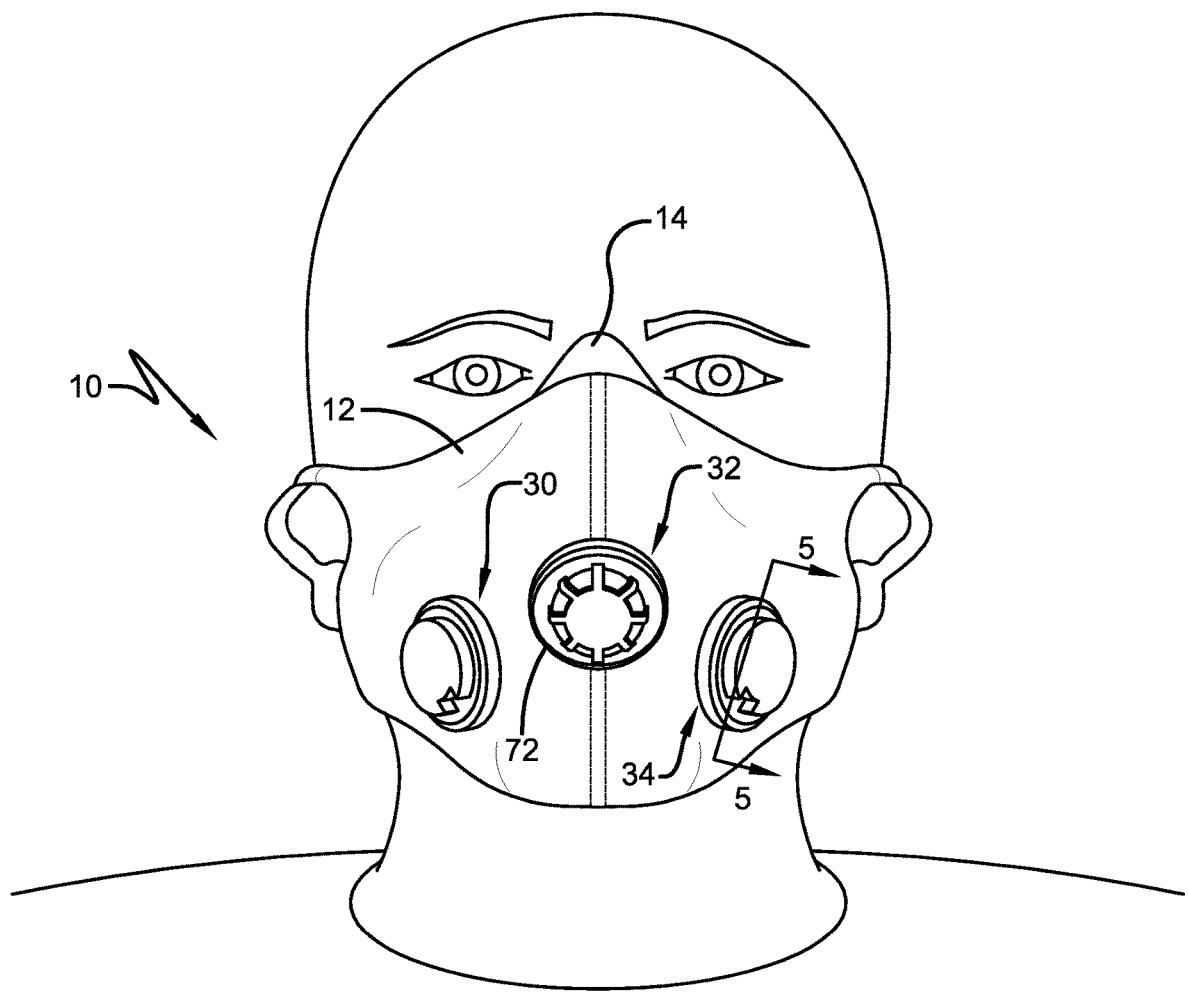
FIG. 1 is a front view of a person wearing an exemplary mask configuration of the disclosure.

With reference to FIGS. 1-6, an exemplary configuration of a scent distributing mask is indicted generally by the numeral 10. As will be further described, a feature of mask 10 is the exhalation valve configuration that allows the wearer to use his breath to distribute a scent from mask 10. The scent can be used to mask the scent of the user's breath with a scent that is attractive or non-threatening to the game being stalked or hunter by the person wearing mask 10. The scent can be designed as a masking or cover scent, an aromatic scent, or a repellant scent. At times, the masking scent may be pleasant to the user but at other times, the user may not wish to inhale or smell any portion of the masking scent being used to mask his breath. This is an important consideration when the hunter is using a urine-based or glandular secretion product for the masking scent.

In one exemplary configuration, mask 10 exhibits a depth-defining and air impermeable body. In the exemplary configuration, the body is provided in the form of a two layer construction including an outer fabric layer 12 overlaying an inner rubberized and enclosed perimeter defining layer 14 integrating a likewise perimeter extending seal 16 which is adapted to overlay the nose and mouth of a wearer in the fashion depicted in FIG. 1. A pair of straps are depicted as integral portions 18 and 20 of the fabric layer 12 extending from a middle location overlapping the rubberized attached layer 14, the straps 18 and 20 have selectively inter-engaging ends 22 and 24 in the form of hook and loop fasteners for affixing mask 10 about the wearer's head (again FIG. 1). Straps 18 and 20 each further depict interior cutout configurations, shown at 26 and 28 by inner cutout area defining surfaces, for seating around and behind the wearer's ears.

Figure 4:
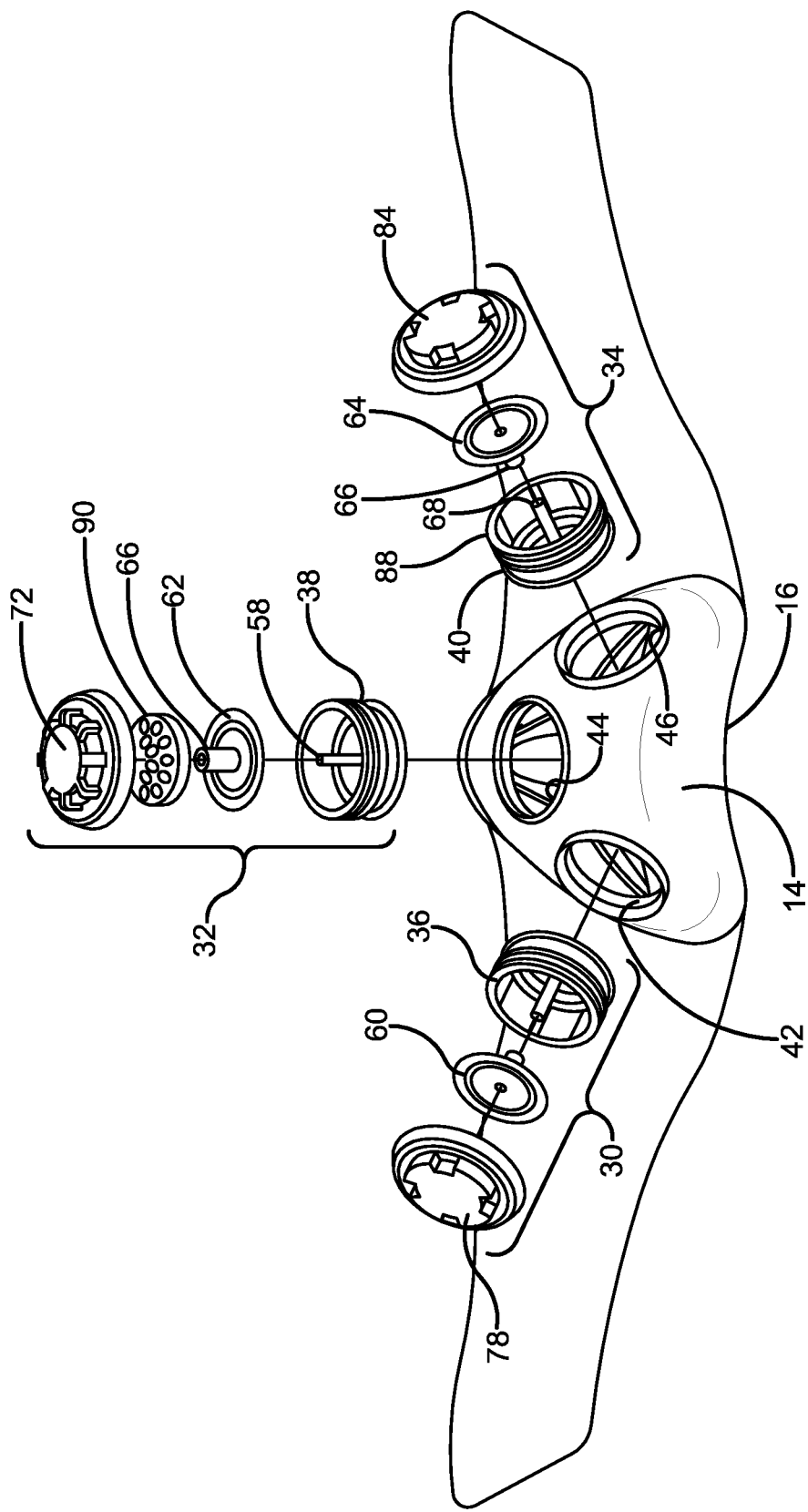
FIG. 4 is an exploded view of the mask.

A plurality of valve subassemblies, such as depicted by valve subassemblies 30, 32, and 34 as best shown in the exploded view of FIG. 4, are incorporated into locations along the body. In the exemplary configuration, valve subassemblies 30 and 34 are inhalation valves with valve subassembly 32 being an exhalation valve. In other configurations, different numbers of inhalation and exhalation valves can be used with mask 10. For example, there can be a plurality of exhalation valves 32. The locations of the valve can be varied compared to the specific exemplary configurations depicted in the drawings.

Figure 5:
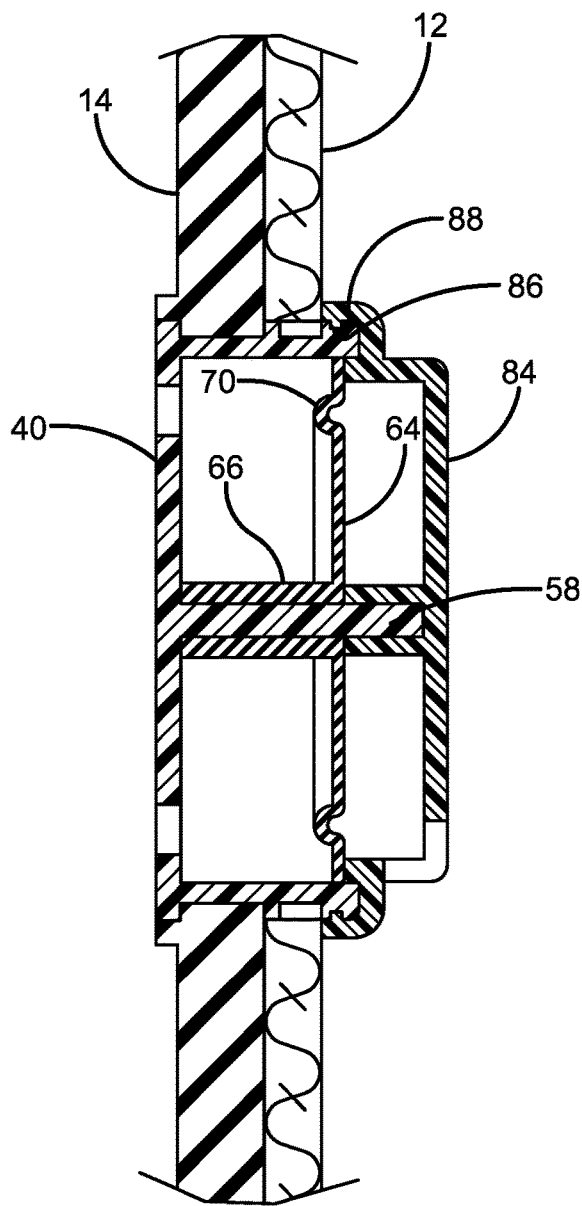
FIG. 5 is a section view taken along line 5-5 of FIG. 1 with the valve closed.
Figure 6:
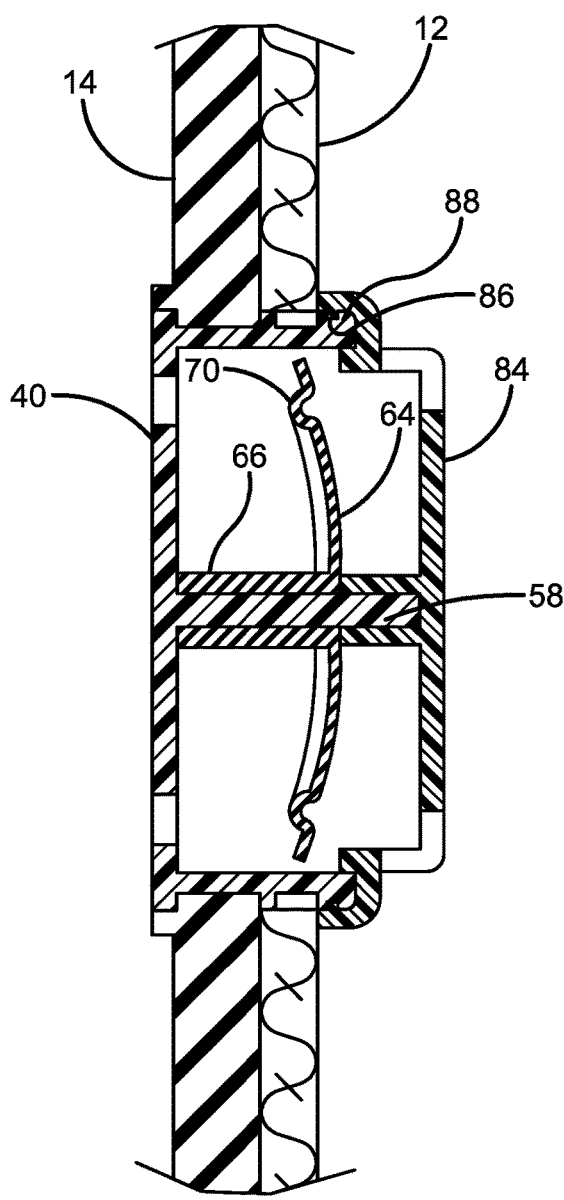
FIG. 6 is a section view similar to FIG. 5 with the valve open.
Figure 7:
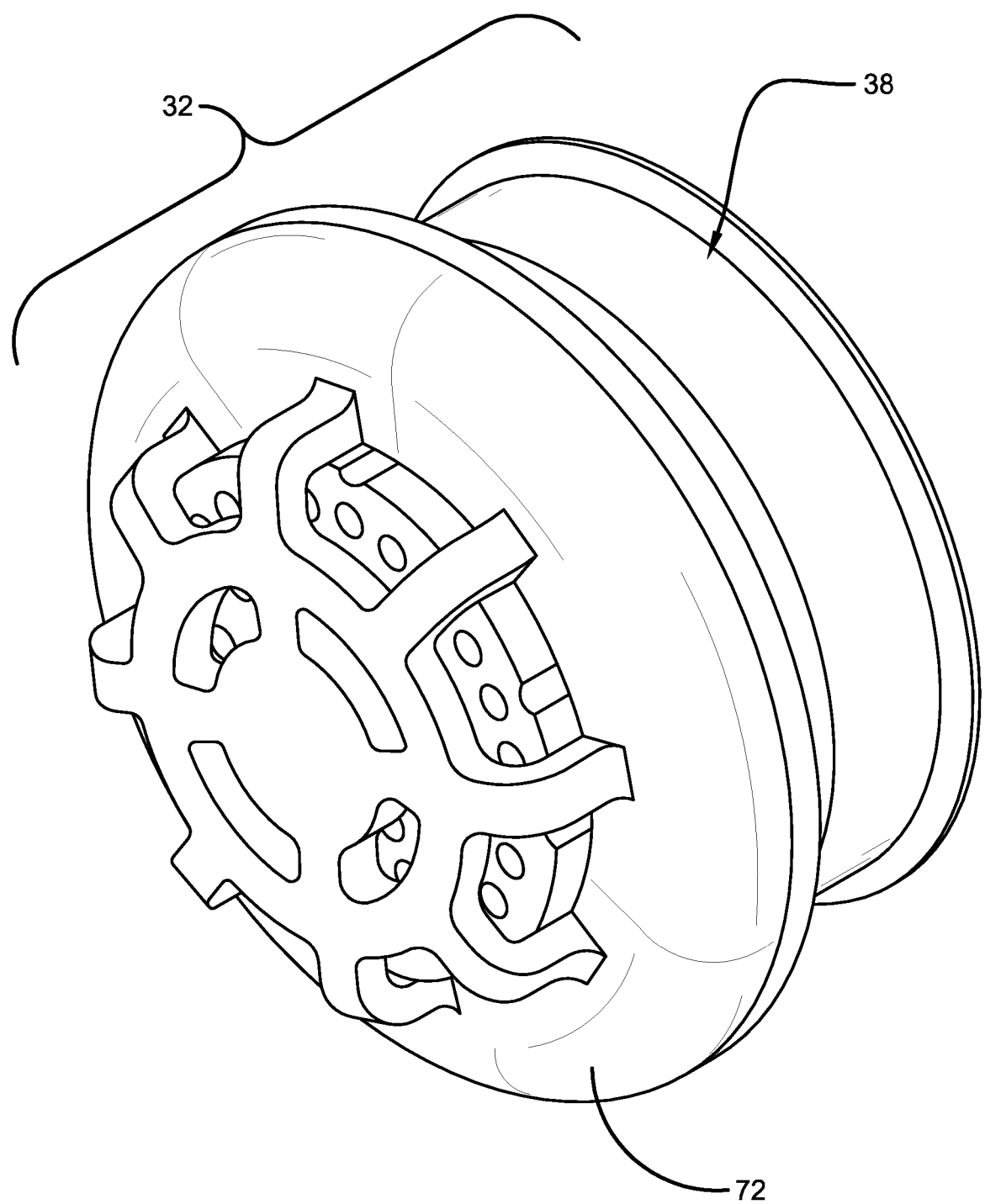
FIG. 7 is a perspective view of the exhalation valve without the mask body.
Figure 8:
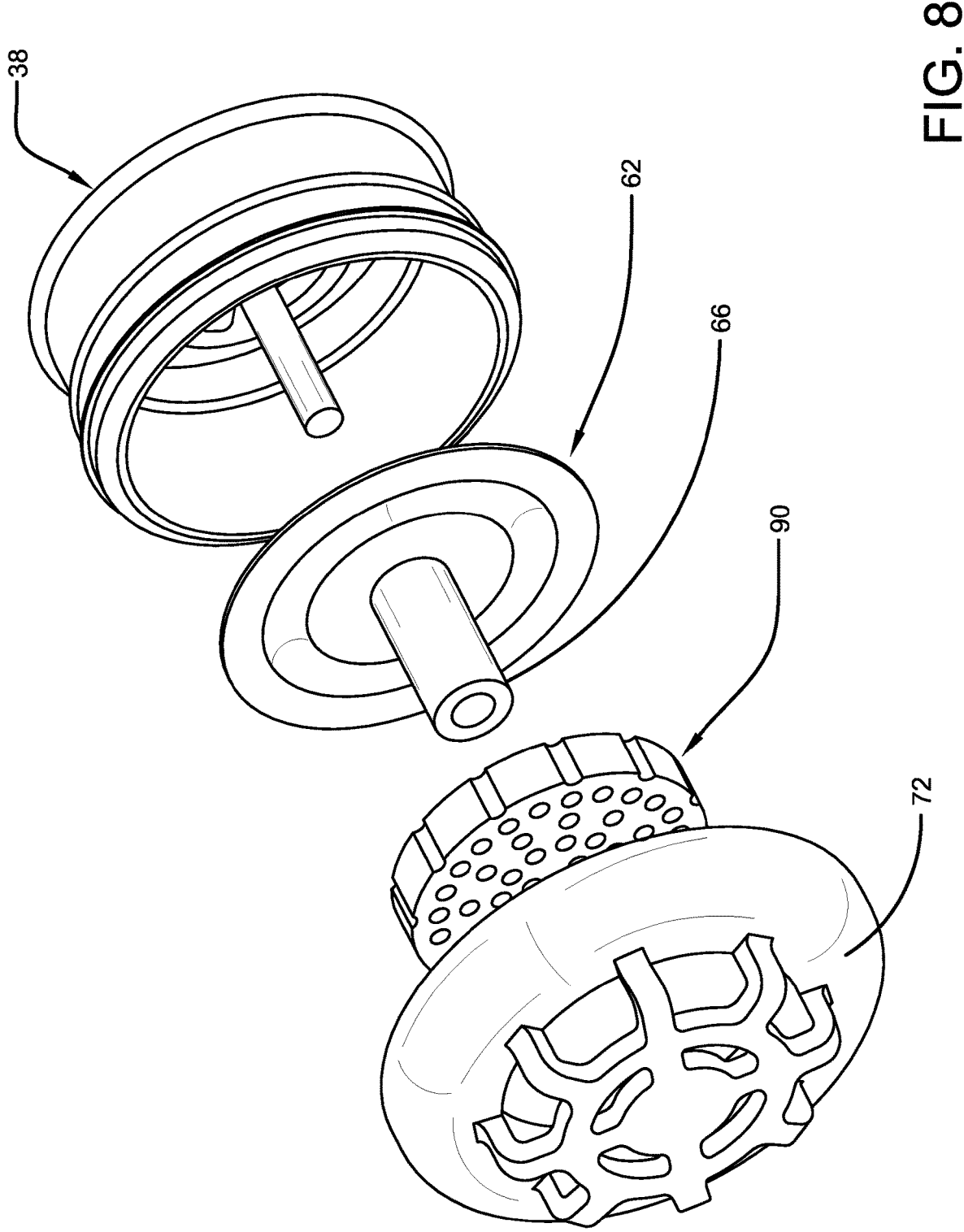
FIG. 8 is an exploded view of the exhalation valve without the mask body.

Each valve subassembly 30, 32 and 34 includes a stem supporting and air passageway configured base, shown at each of 36, 38 and 40 in the exploded perspective of FIG. 4, with selected base 40 further depicted in cross sectional cutaway in each of FIGS. 5 and 6. As depicted, the base 36, 38 and 40 each exhibits a desired shape such as cylindrical and which is mounted through the mask body, this depicted in FIG. 4 as corresponding inner extending perimeter surfaces 42, 44 and 46 associated with the rubberized inner layer 14 and so that the base components 36, 38 and 40 are in communication with the exterior and interior surfaces of the mask. Although not shown, the outer fabric layer 12, depicted in FIGS. 1-3 in mounted overlaying fashion over the inner rubberized layer 14, includes likewise aligning cutout profiles for mating with the cutout perimeter surfaces 42, 44 and 46 in FIG. 4.

Figure 3:
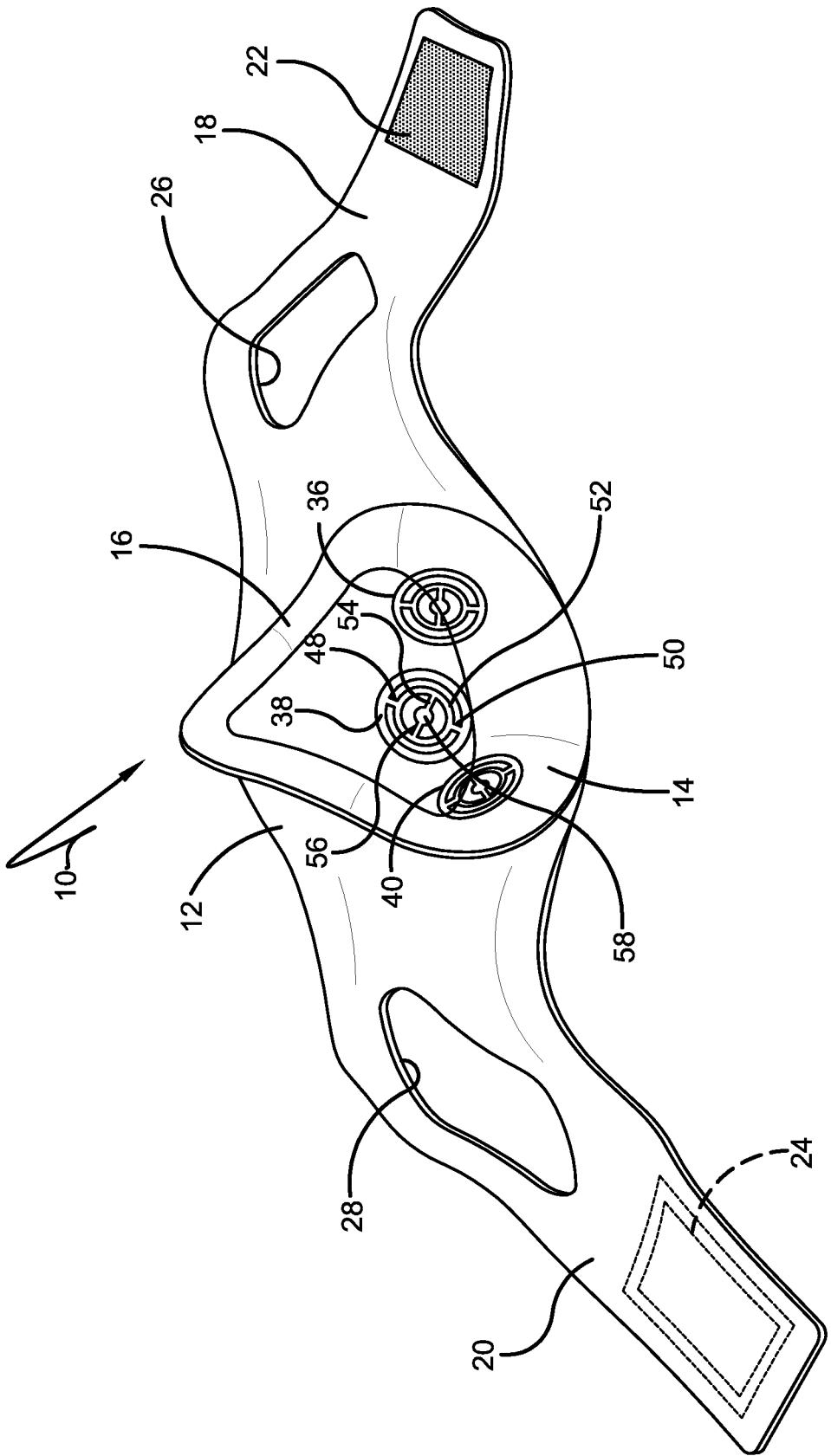
FIG. 3 is a rear perspective view of the mask of FIG. 1.

As best shown when viewing FIG. 4 in combination with the reversed perspective of FIG. 3, each base 36, 38 and 40 (and with reference specifically to selected base 38) exhibits a webbed configuration for facilitating easy air flow through the base. As further shown, this includes in one non-limiting configuration a bottom layer of the base (again referencing selected base 38) as having a plurality of interconnecting portions including outer web locations 48 and 50, an inner arcuate supported web 52, and inner-most web locations 54 and 56 which collectively establish the desired air flow permeability combined with supporting, at an inner most central location, an outwardly extending stem 58 (see again FIG. 4).

A plurality of flexible diaphragms are shown at each of 60, 62 and 64 in FIG. 4 and are each mounted to an associated stem in seating fashion within the associated base 36, 38 and 40. As further best shown in FIG. 4, in combination with the linear cutaways of FIGS. 5 and 6, each of the diaphragms, with reference in particular to selected diaphragm 64 associated with middle (second) valve subassembly 32, are each constructed of a rubberized or deformable material which includes a thin and substantially planar shape portion exhibiting an outline matching an inner facing perimeter of the associated base. A post 66 on each diaphragm 60, 62, 64, exhibits a channeled interior extending from the outer and thin planar shape portion and which mounts over the corresponding supporting stem (for example, stems 58 and 68) for arraying the planar portion of the diaphragm within the bases.

In this fashion, and referencing first the cutaway of FIG. 5, the selected flexible diaphragm is depicted in each of a first sealed configuration in which an out ribbed and perimeter extending location 70 is depicted in an un-deflected condition. With further reference to FIG. 6, the flexible diaphragm is depicted in an inwardly resisting responsive and arcuate deflected condition such as which results from inhalation inducted by the wearer.

As shown in FIG. 4, it is understood that any one or more of the diaphragms 60, 62, and 66 can be reversibly mounted (as depicted by middle selected diaphragm 62) to the corresponding base extending stem 58). In this manner, the other selected pair of diaphragms 60 and 64 are arranged in the first position depicted in FIGS. 5 and 6, and again in which the outer planar shape portion extends radially at an elevated location within the base in an inhalation permitting configuration with the middle diaphragm 62 being arranged in a second position in which the planar shape overlays closely the bottom surface of the webbed constructed and airflow passageway configured base 38, such as further providing the selected valve subassembly with a substantially inhalation preventing configuration.

Figure 2:
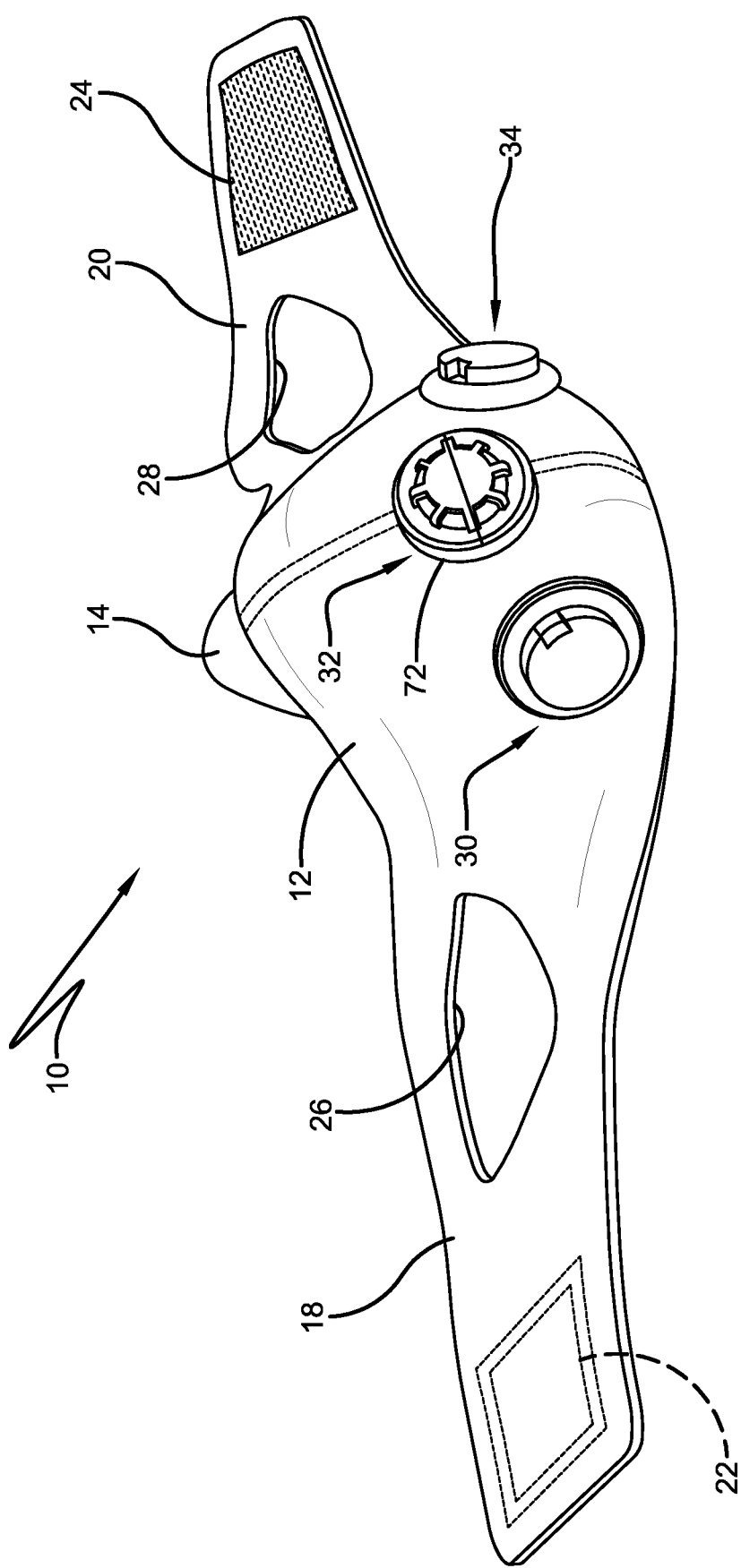
FIG. 2 is a front perspective view of the mask of FIG. 1.

Each of the valve subassemblies further includes one or more exterior engageable caps 72, 78, 84 attachable over an exterior rim of its base of valve subassembly in each of FIGS. 1, 2 and 4. Each of the caps 72, 78, 84 engages upon an exterior side of its associated base (this further best shown by selected cap 84 in the cutaway of FIGS. 5-6 which includes an outer most perimeter located and inwardly facing edge profile 86 for engaging underneath an outermost lip edge (at 88 of the selected base 40. Each of the caps 72, 78, 84 further exhibits an outer circumferential extending portion and an inner raised portion incorporating a selected number of apertures defined about a perimeter thereof.

Mask 10 described above is worn by the hunter to camouflage his face from game and the hunter's breath in inhaled through valves 30 and 34 while being exhaled through valve 32. In order to mask the hunter's breath from game, mask 10 includes a vapor device in the form of a scent carrier 90 disposed in exhalation valve 32 downstream of diaphragm 62 so that the wearer's breath engages scent carrier 90 on the downstream side of diaphragm 62. Locating scent carrier 90 in this position eliminates or substantially minimizes the chance of scent being smelled or inhaled by the wearer. The wearer's exhaled breath passes through the exhalation valve almost immediately after leaving the wearer's body and is still moist and warm when coming into contact with scent carrier 90. The exhalation picks up scent from the scent carrier which masks the wearer's breath. The scent particles are distributed in the air by evaporation or sublimation where they are combined with the user's breath. In this exemplary configuration, the user's exhalation does not need to be filtered before being directed into contact with scent carrier 90. Adding the scent to the user's breath helps prevent game from identifying the hunter by smelling the hunter's exhalation. In other configurations, a filter can be used to filter the user's breath prior to bring the exhalation into contact with scent carrier 90. The filter can be an activated carbon filter. The scent can be designed as a masking or cover scent, an aromatic scent, or a repellant scent.

Scent carrier 90 can be a porous packet of loose powder; a wetted sponge, a wetted cloth, a wetted mass of fibrous material that holds a liquid-based scent material such as a scent oil; a scented material that readily sublimates or evaporates when repeatedly brought into contact with human exhalation, or a scent-impregnated solid such as a scent-impregnated polymer or wax that releases the scent in response to human exhalation. Carrier 90 can be a commercially available type and may be of a rigid and porous paper base pad which has been previously impregnated with oils of the particular fragrance or scent material. These scent carriers 90 are configured to release the scent or fragrance without the need for a powered heater in response to a low flow, relatively warm, and relatively moist human exhalation. Thus, a high flow rate of air nor a high temperature is needed to add the scent to the exhalation.

In the FIG. 12 configuration of scent carrier 90, a solid disc-shaped body is provided with a plurality of openings to allow for the passage of exhaled breath and to increase the surface area of carrier 90 for contact with the exhaled breath. The body of carrier 90 defines a plurality of openings and the outer perimeter edge of the body defines a series of channels that define air paths between the outer perimeter edge of carrier 90 and the inner sidewall of cap 72. Carrier 90 is a semi-permeable solid that is soaked in a scented liquid (such as a scented oil) or is formed from a polymer impregnated blended with a fragrance or a scented material. Carrier 90 can be a moldable polymer that is impregnated with the scent. U.S. Pat. Nos. 4,802,626, 4,598,006, 4,095,031, and 3,553,296 are incorporated herein by reference as an exemplary method for forming a scented solid. The user of mask 10 can replace carrier 90 as needed. The user can replace carrier 90 when the scent has been depleted or when the user wishes to change the scent. In order to change scent carrier 90, the user removes cap 72.

Exemplary configurations of additional breath-powered scent distribution devices that distribute vaporized liquid scent materials are indicated generally by the reference numeral 102 in FIGS. 13-24. The disclosure also provides a method for distributing a vaporized scent by using the user's own breath. Devices 102 rapidly vaporize the liquid scent material with an electrically-powered burner that change the liquid scent material to an airborne vapor almost instantly (less than a quarter second) but at least in less than one to two seconds. Devices 102 can be activated by the user by pushing a power button or through the use of a sensor that activates the device in response to the user's breath.

Figure 13:
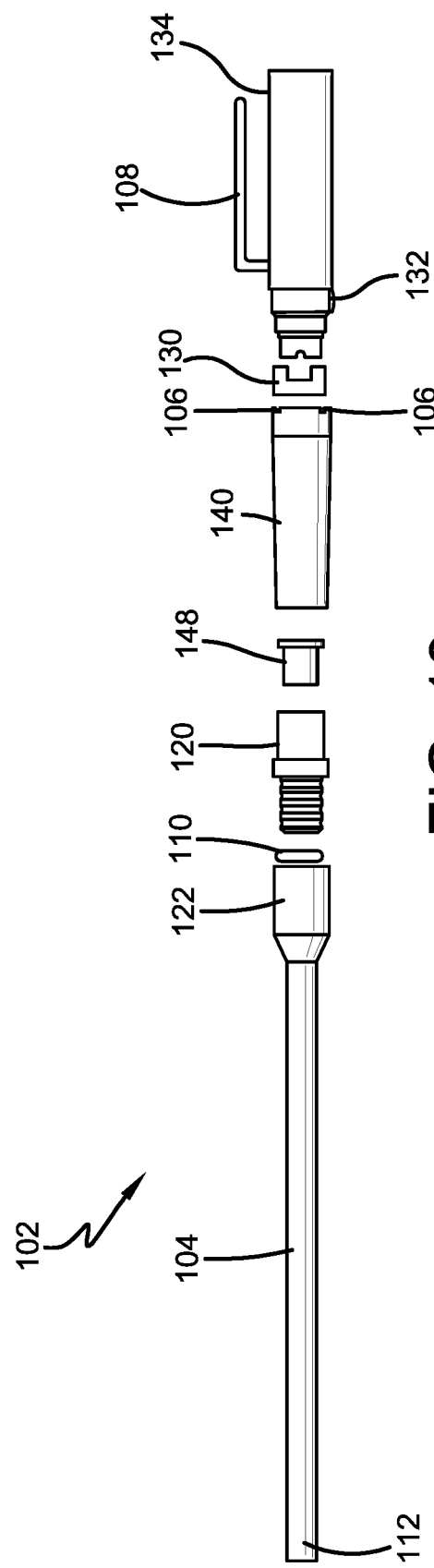
FIG. 13 is an exploded view of an alternative exemplary configuration for the device of the disclosure.
Figure 14A:
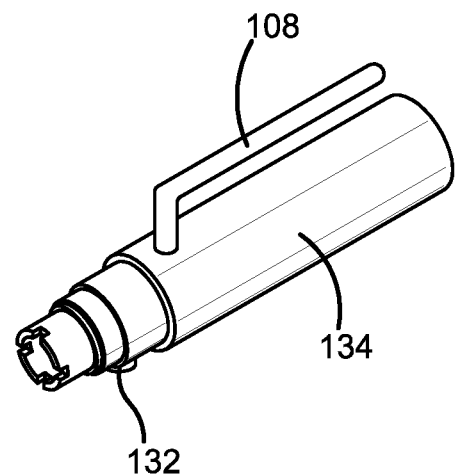
FIG. 14A is a perspective view of a battery housing and an example of a switch that can be used to activate the vaporizing coil.
Figure 14B:
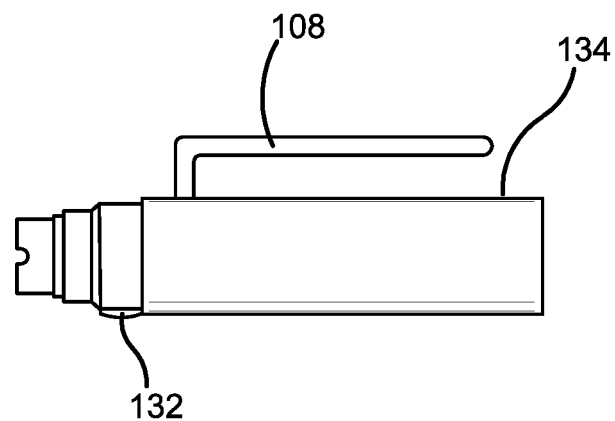
FIG. 14B is a side view of FIG. 14A.
Figure 15A:
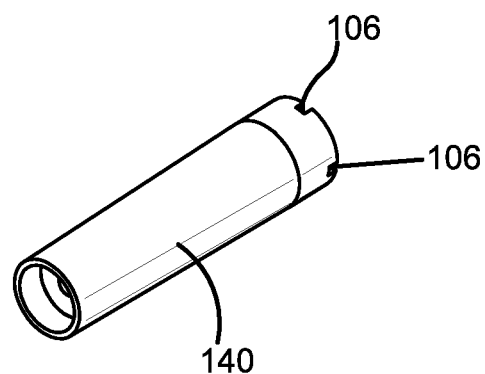
FIG. 15A is a perspective view of the tank used to hold the liquid scent material.
Figure 15B:
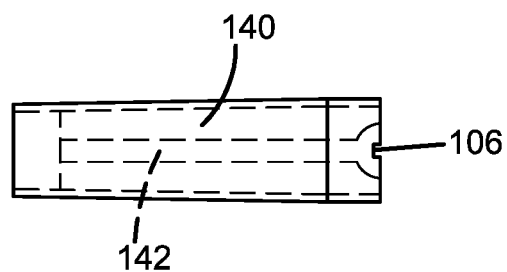
FIG. 15B is a side view of FIG. 15A.
Figure 18A:
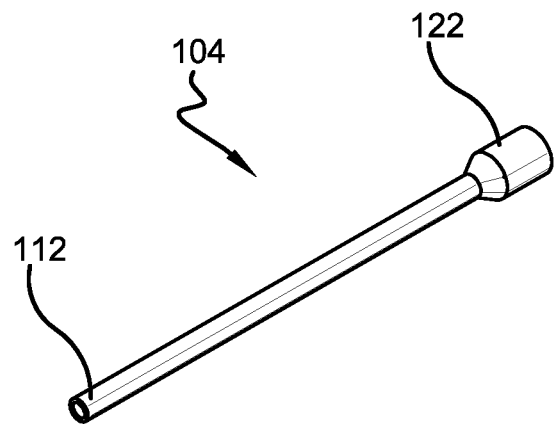
FIG. 18A is a perspective view of an exemplary configuration for the inlet tube.
Figure 18B:
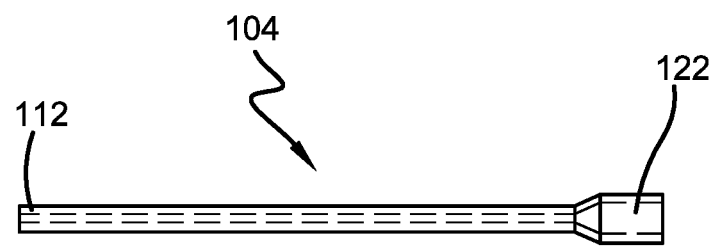
FIG. 18B is a side view of FIG. 18A.
Figure 19:
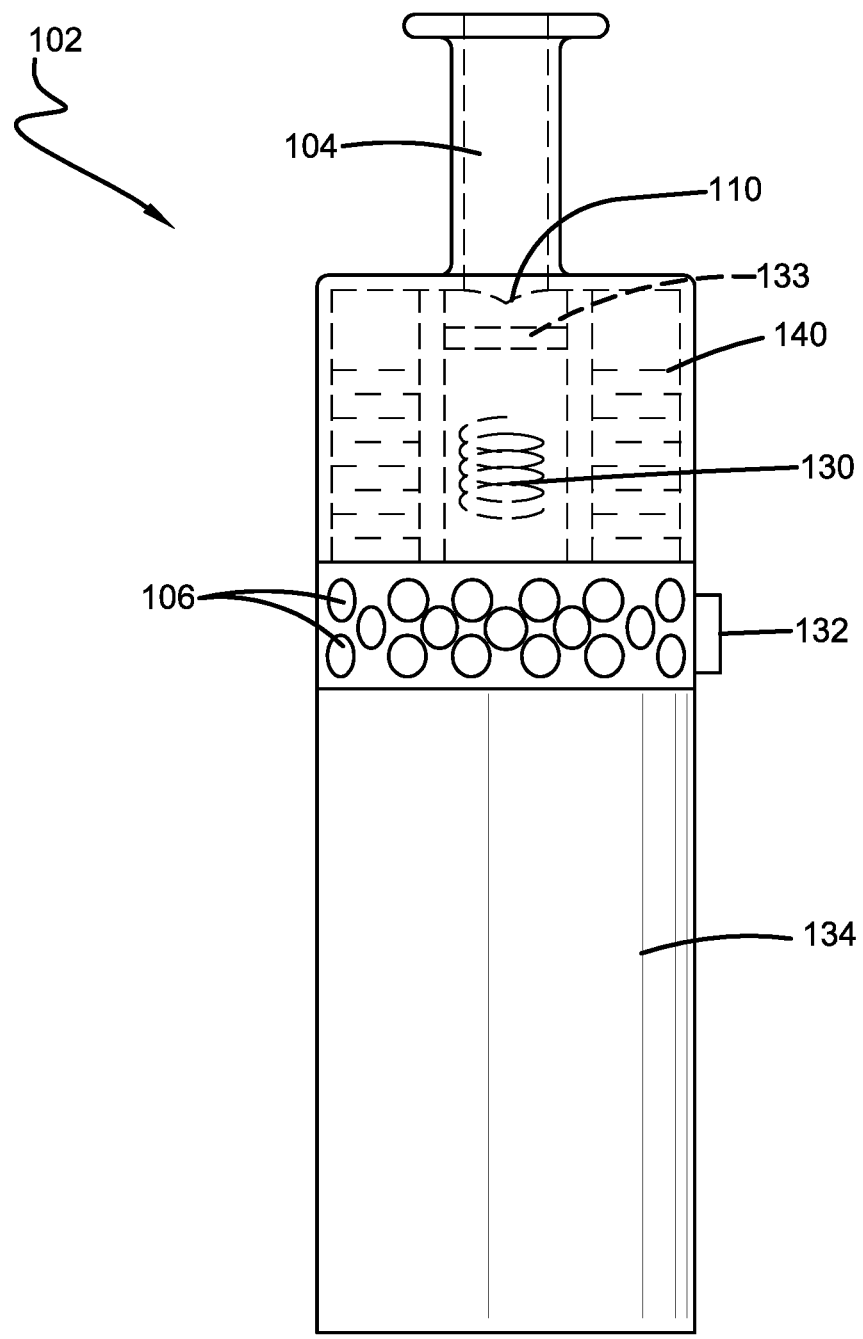
FIG. 19 is a schematic view of another alternative exemplary configuration for the breath-powered vapor distribution device.
Figure 22:
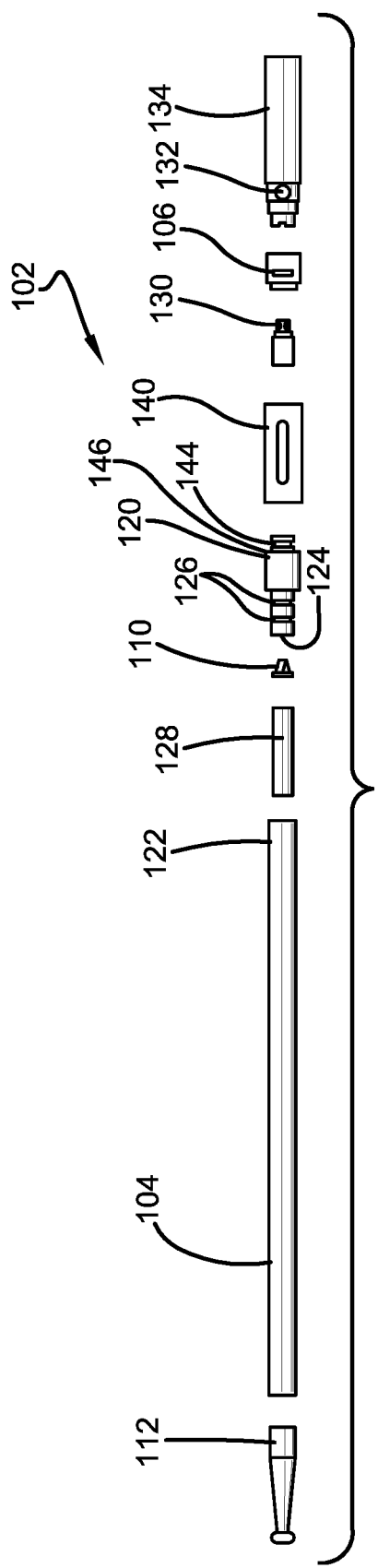
FIG. 22 is another alternative exemplary configuration for the device of the disclosure.
Figure 23:
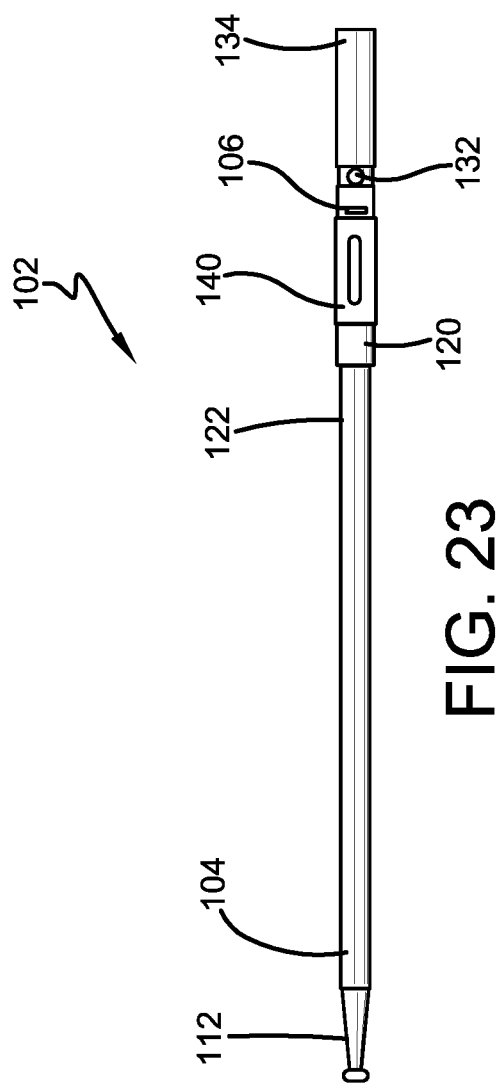
FIG. 23 is a side view of FIG. 22.

In one exemplary configuration depicted in FIG. 13, device 102 has an inlet tube 104 through which the user blows his breath into device 102. The user's breath is used either to distribute the vaporized liquid scent material, activate the vaporization of the liquid scent material, or both. Inlet tube 104 can be a short tube such as the one found on a duck call and illustrated in FIG. 19 or inlet tube 104 can be an elongated flexible tube such as the examples depicted in FIGS. 13, 18, and 20-23 that allow the outlet 106 of device 102 to be positioned in a location remote from the user's face. Such a location can be on the user's clothing such as a belt or a boot. Such a location also can be on a tree stand or the outside of a hunting blind. As an option, the body of the device 102 includes a mount 108 such as a mounting clip, a mounting magnet, or a mounting band. Elongated tube 104 can have a length greater than about five to fifteen times the length of the tank that holds the liquid scent material. Tube 104 can have a length of about six to thirty-six inches to allow the outlet to be positioned away from the user's mouth. A length of twelve to eighteen inches is provided as one exemplary configuration.

A one-way valve 110 is used to prevent the user from inhaling the vapor produced by device 102. Valve 110 can be positioned between inlet tube 104 and the body of device 102. Valve 110 also can be positioned in the tip 112 of inlet tube 104. Valve 110 also can be carried within the body of device 102 upstream of the electric vaporizing coil. Valve 110 allows the user's breath to be forced into the body of device 102 but does not allow the vaporized scent to be pulled back into inlet tube 104 in the event the user inhales through tube 104.

Inlet tube 104 is sealed to the body of device 102. A tube adapter 120 is used to sealingly receive the outer end 122 of inlet tube 104. Valve 110 may be disposed against the first end 124 of adapter 120 and the inner surface of outer end 122 of inlet tube 104 can engage valve 110. The portion of adapter 120 that receives outer end 122 of inlet tube 104 can define a plurality of concentric recesses 126 that help grip the inner surface of outer end 122 or can hold an adhesive or epoxy to connect the two elements. A filter 128 can be used to reduce or eliminate scents from the user's breath before the user's breath is used to distribute the vapor from device 102.

A vaporizing coil 130 is in fluid communication with inlet tube 104 so that the breath flow passes through or around vaporizing coil 130. Vaporizing coil 130 is electrically connected through a switch 132 or an airflow sensor 133 to a power source 134. Power source 134 can be a battery carried by the body. The battery can be a disposable battery or a rechargeable battery. Switch 132 is an on/off switch that completes the electrical circuit to between power source 134 and vaporizing coil 130. When the electrical circuit is complete, vaporizing coil 130 is capable of vaporizing a liquid hunting scent material to a vapor that is readily carried by the breath flow through outlet 106 defined by the body. Switch 132 can be moved to the on position where it remains on until the user moves switch 132 to the off position. In this configuration, coil 130 is continuously energized and creates vapor as long as scent liquid material is present in the tank 140. In another configuration, switch 132 is on only until the user releases switch 132. This type of switch automatically turns the device 102 off and stops the creation of the vapor shortly after switch 132 is released. Switch 132 can be located for actuation by the user's finger or thumb. In the configurations depicted in the drawings, switch 132 is carried by power source 134, but switch 132 also can be disposed on or close to tip 112 which is useful when burner 130 is clipped to the user's belt or located on a portion of the tree stand or outside of a blind. Locating switch 132 near tip 112 also keeps the user's hand away from the vapor being distributed by device 102.

Figure 24:
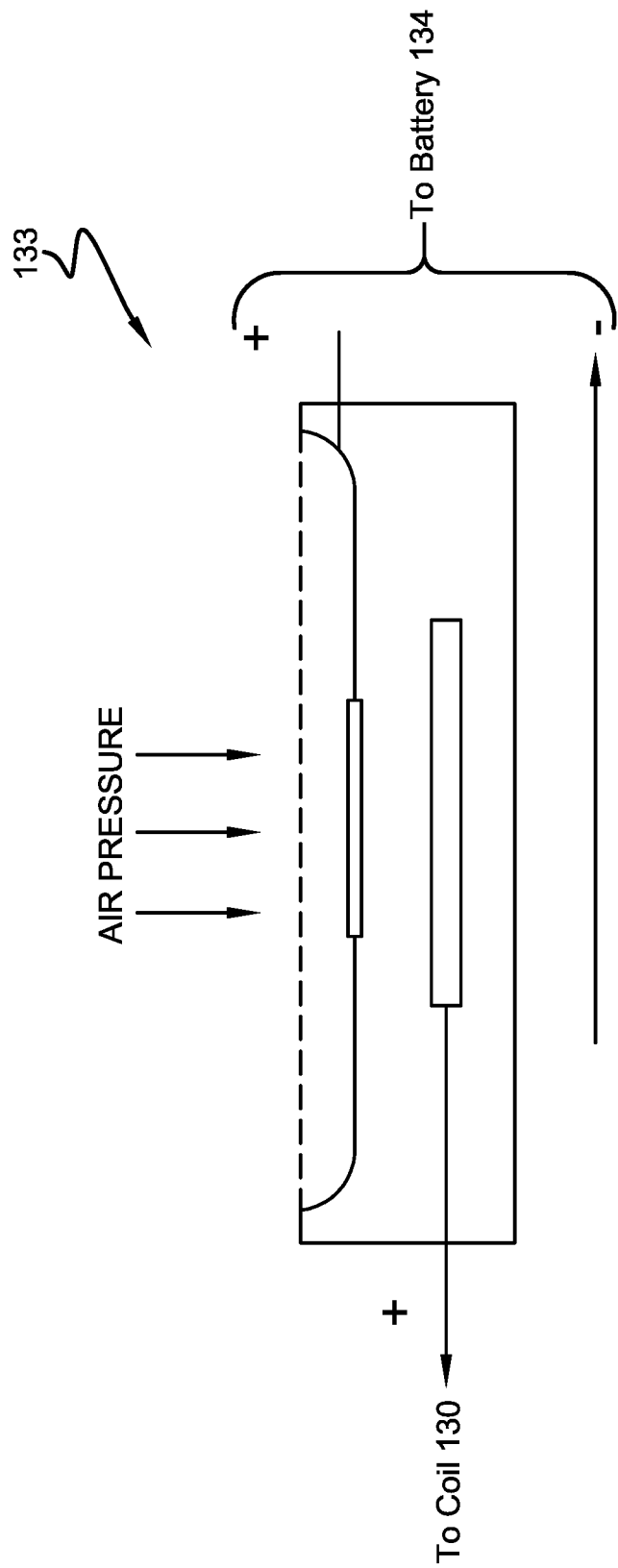
FIG. 24 is a schematic of an exemplary sensor that can be used to activate the device in response to the user's breath blowing into the device.

In another configuration, sensor 133 can be used to sense the user's breath being blown into device 102. When sensor 133 is activated, power is delivered to coil 130. This allows device 102 to automatically create and distribute vapor when the user blows into device 102. Sensor 133 can be a pressure sensor, temperature sensor, moisture sensor, airflow sensor, or a motion sensor that detects when valve 110 is opened to allow the user's breath to pass through valve 110. Sensor 133 can be a mechanical or electro-mechanical switch. A schematic of an exemplary sensor 133 is depicted in FIG. 24 wherein a biased member is moved into electrical contact when the user blows into device 102 and the biased member returns to a resting position to break the electrical circuit when the airflow stops. The biased member can be a spring or an elastomeric material.

Coil 130 can be located near power source 134 with the user's breath passing through or around a liquid tank 140 in an airflow channel 142 disposed through tank 140 or around tank 140. Alternatively, coil 130 can be located between liquid tank 140 and adapter 120 with adapter 120 or tank 140 defining outlet 106.

Tank 140 can slide over the second end 144 of adapter 120 and abuts the flange 146 of adapter 120. In one configuration, an insert 148 having a flange 150 is slid into adapter 120 with tank 140 sliding over flange 150.

In all of these configurations, the body of device 102 defines a liquid scent material inlet that allows the liquid scent material to be in fluid communication with the coil 130. A wick can be used to control the flow of the liquid scent material to coil 130. Coil 130 is an electric resistive heating-style element (burner coil) that creates heat when electric current is passed through coil 130. The wick limits the amount of liquid that is brought into contact or proximity with coil 130. The wick can be a screen having small openings or an absorbent material that draws the liquid to coil 130.

Liquid tank 140 that carries the liquid scent material that is vaporized into an airborne vapor that can be used as described below as a lure designed to attract hunting game, as a game or insect repellant, as a scent eliminator, or as an air freshener. Liquid tank 140 can be in the form of a removable and replaceable tank that can carry burner 130 or be separable from burner 130 or liquid tank 140 can be refillable with a sealable fill inlet. Liquid tank 140 can threadedly receive burner 130 and liquid tank 140 can be threaded to power source 134.

The body defines an outlet for the vapor and breath flow. The outlet can be a single outlet. The outlet also can be a plurality of small holes disposed in the sidewall of the body around the perimeter of the body. An extended outlet tube can be used to direct the breath flow and vapor away from the body of the device.

In each of the electric-powered embodiments describe above, the liquid scent material that is being vaporized can be a combination of a glycol substance with an aromatic material or a scent-elimination material. The aromatic material can be a solid or liquid animal lure substance. The glycol substance can be a propylene glycol, a vegetable glycerin, a combination of both, and/or a combination of these with water. The animal lure aromatic material can be a liquid or solid animal urine or glandular secretion. The solid materials can be made by dehydration. In any of these combinations, water can be added as needed. The dehydrated urine can be formed by freeze drying, flash drying liquid urine, or otherwise dehydrating the liquid urine to form the additive to the glycol. The aromatic material can be designed to repel animals or insects and can thus be a predator smell or a citronella or a picaridin material such as an oil. The aromatic material can be a cover scent used by a hunter to cover his scent when entering or leaving a hunt area. The aromatic material can be a pleasant-smelling material that one can use to freshen room air or an automobile. These aromatic materials can be clean-smelling materials, flower-based materials, fruit-based materials, pleasant-smelling food materials, pleasant-smelling outdoor smells, spices, tropical smells, and others enjoyable to human users. These can be provided as oils or powders and mixed with the glycol.

The liquid scent material also can be a vaporizable material that functions to eliminate or reduce scent. The vaporizable liquid scent material includes a percentage of carbon, charcoal, activated carbon, or coconut shell activated carbon, or palm kernel shell charcoal or a combination of these substances. The combination of these substances with a vaporizable material such as the glycol materials disclosed above allow a scent elimination substance to be generated to be used by a hunter to eliminate or reduce scents that can alert game to the hunter's presence.

Devices 102 have the advantage of only vaporizing the liquid scent material on demand. The device does not waste the liquid scent material by continuously vaporizing unless the user selects continuous operation as an option. The device will function in cold weather and the vaporized glycol-based vapor substance hangs in the air and does not distribute itself in the air as fast as other scent materials. The electric heating element does not create any additional fuel scent through a combustion process. The removable and replaceable tanks keep the scent fresh and allow the user to readily refill the device without skin contact with the scent liquid. There is also no risk of spilling the liquid.

One method of using devices 102 is to provide device with a repallant scent that drives game away from the scent. Devices 102 are then used along a boundary or in an area such as a user's yard wherein the user does not want the game to cross or to congregate. The repallant material can include the scent of a predator, a soap, a human, a dog, or the like. The user can set a scent fence line of vaporized scents. This creates a scent barrier than helps keep game from passing through the area. This configuration of the device can be used to deter game such as deer from entering a garden area or a landscaped area where the deer feed on the plantings.

Another use for devices 102 is to provide a vaporizable material in devices 102 that reduces or eliminates scent particles from the air that is exposed to the vaporized material. This device is used for scent elimination. The disclosure provides a vaporizable mixture that includes a percentage of carbon, charcoal, activated carbon, or coconut shell activated carbon, or palm kernel shell charcoal or a combination of these substances. The combination of these substances with a vaporizable material such as the glycol materials discussed above allow a scent elimination substance to be generated to be used by a hunter to eliminate or reduce scents that can alert game to the hunter's presence.

An optional alternative use for the device is to attach a scent tank to the device that creates a pleasant smelling vapor for use in deodorizing a vehicle, a house, clothing, and the like. An advantage here is that by using the removable tank, there is no deer urine scent left on the device when a pleasant smelling scent is installed. This is especially true when the replaceable tanks carry their own burner coils. As such, the same device used to distribute the deer urine smell can also be used to distribute a pleasant smelling vapor— such as a vanilla—for the hunter's vehicle on the drive home.

Figure 25:
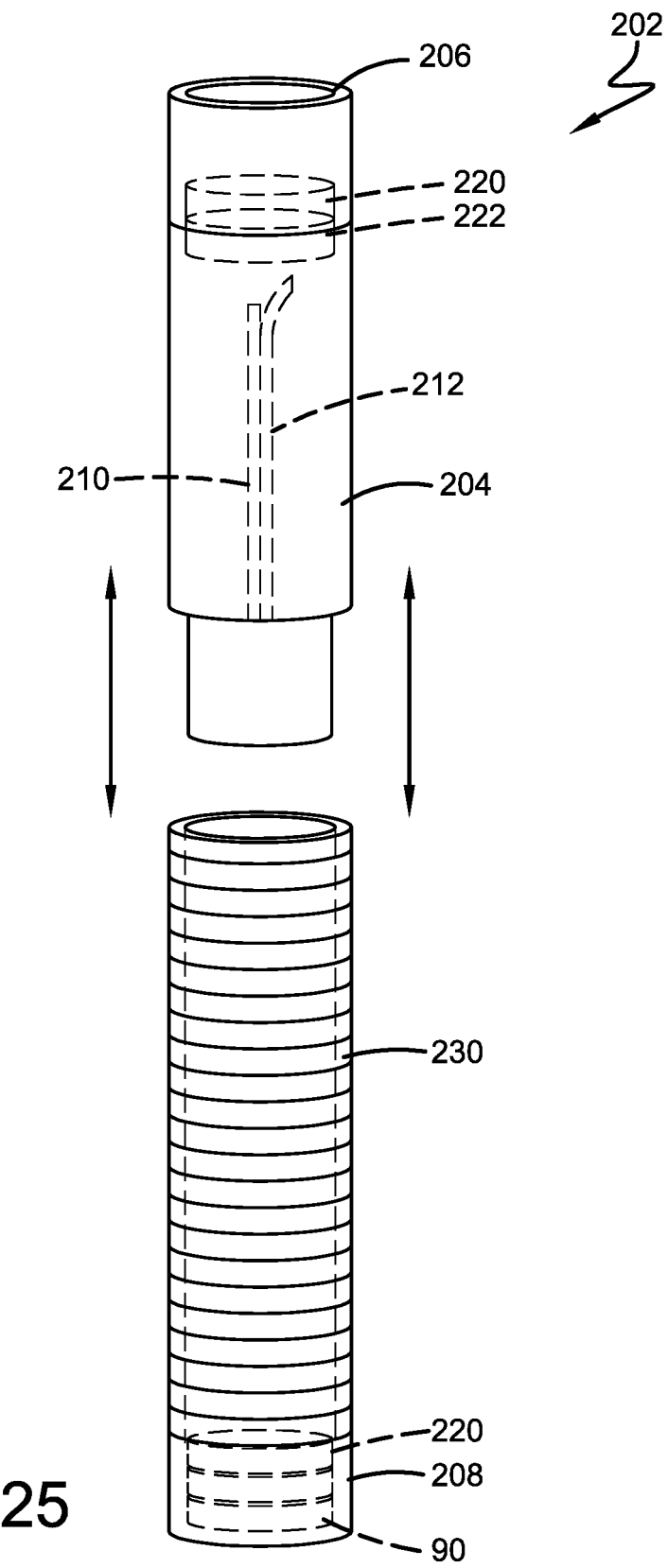
FIG. 25 is a schematic drawing of a first game call configuration that distributes scent when used.
Figure 26:
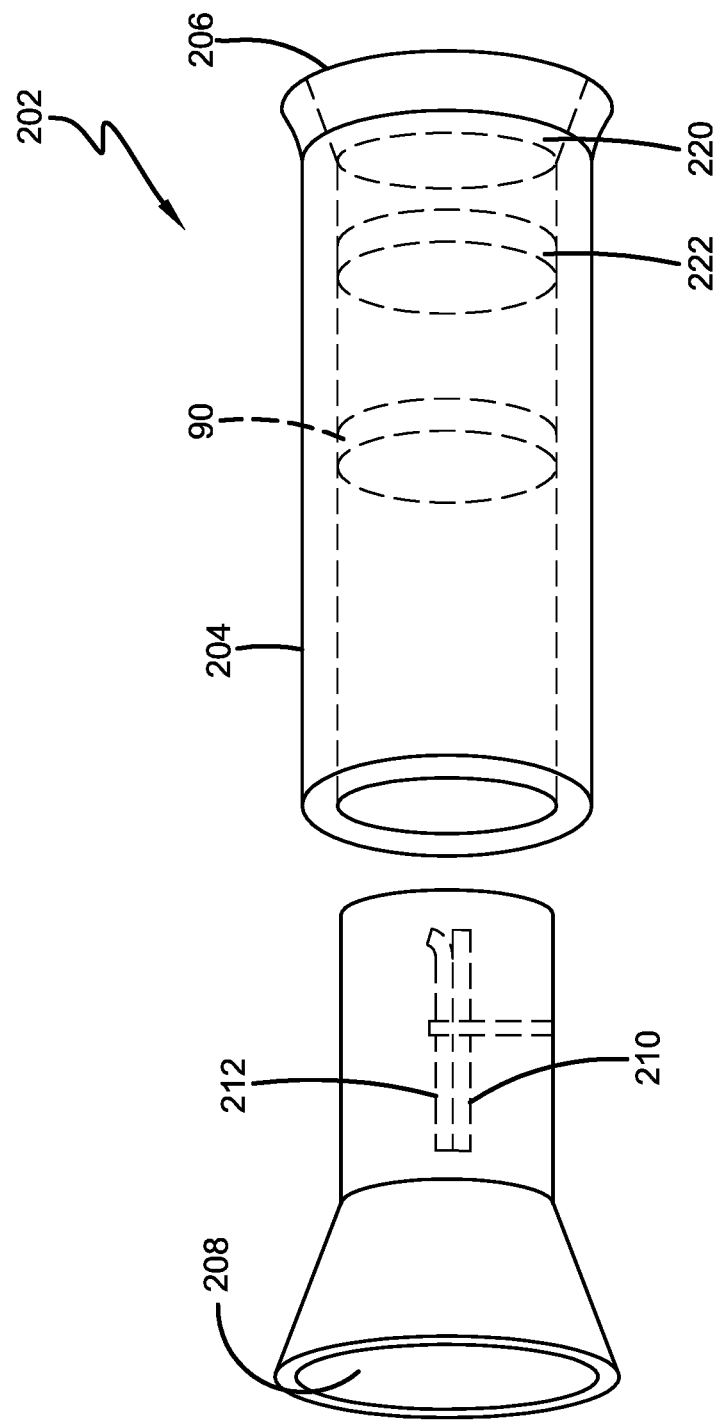
FIG. 26 is a schematic drawing of a second game call configuration that distributes scent when used.
Figure 27:
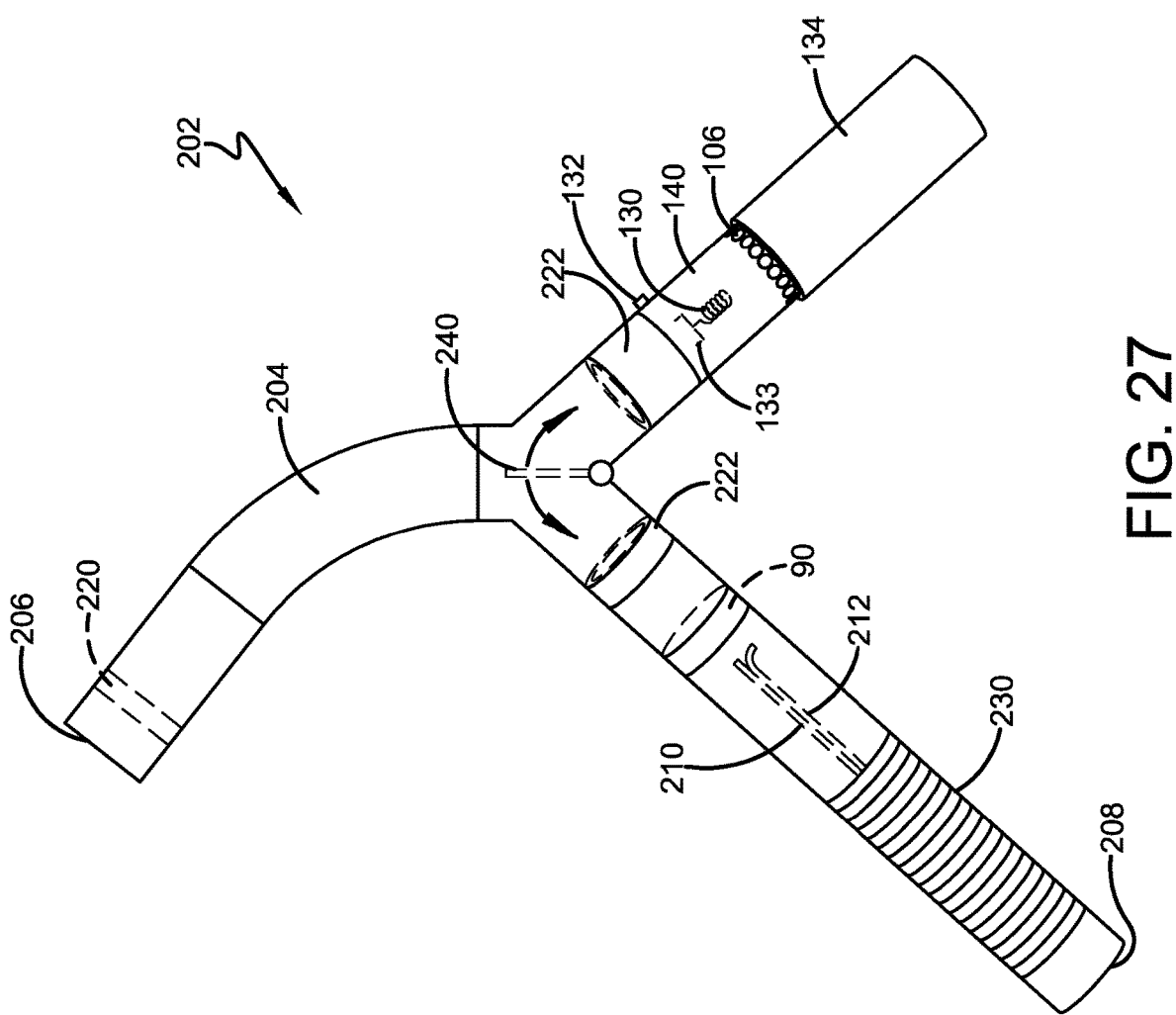
FIG. 27 is a schematic drawing of a third game call configuration with a switchable electronic vaporizer that generates and distributes vapor.

Exemplary configurations of game calls that distribute scent when used are indicated generally by the numeral 202 in FIGS. 25-27. Game calls 202 distribute a scent when game call 202 is used to produce a game call sound. The scent is distributed by the airflow which is also used to create the call's sound. Each configuration of game call 202 includes a body 204 that defines an airflow pathway from an inlet 206 to an outlet 208. The airflow can be provided by a squeeze bladder or from the user blowing into body 204. The body 204 includes the airflow inlet 206 and the airflow outlet 208. The airflow passes over a reed 210 to produce the sound and across, along, or through a scent carrier to provide a scent to the airflow.

Each configuration includes a reed 210 that produces a game call sound when exposed to the airflow. Device 202 can be configured as a deer call, a duck call, a goose call, or a predator call. Reed 210 can be removably and replaceably mounted to and disposed next to a reed holder 212 that is removably and replaceably mounted to body 204. Reed 210 can be a fixed style reed or an adjustable reed. The adjustable reed can include a movable flexible band that can be moved along the body of reed 210. A threaded rod can be selective tightened against a portion of reed 210 to change its sound.

When device 202 is used with the user's breath, a breath filter 220 is used to remove or minimize the scents from of the user's breath. Filter 220 can be removably and replaceably carried near at inlet 206, outlet 208, at a location between, or multiple filters can be used at multiple locations. Filter 220 can be an activated carbon filter or charcoal that allows airflow through its body. Filter 220 does not impede the air flow to a degree that interferes with the sound produced by the game call. Inlet filter 220 can be carried by body 204 immediately inside inlet 206 to remove a substantially amount of the scent from the user's breath. Filter 220 can be snap fit into body 204 or threaded. A one-way valve 222 can be used to limit airflow to a single direction.

Filter 220 can be provided as an add-on feature for existing game calls. When provided as an add-on element, filter 220 can be configured to be used at the inlet or outlet of the game call. As an add-on element, filter 220 includes an adjustable elastic boot that than fits over a variety of game call inlets and resiliently seals to the outer body of the existing third party game calls.

In the configuration of FIG. 25, body 204 includes a removable scent carrier tube 230. Tube 230 can be configured as a deer grunt tube. Tube 230 can be threaded to the mouthpiece portion of body 204 or snap fit or friction fit. This allows the user to change scents or refresh device 202 by adding a new tube 230. The configuration of tube 230 is adjustable and/or flexible. The length and configuration of tube 230 can be used to change the sound produced by device 202. The entire body of this tube can be infused with scent in one of the manners described below, the polymer that is used to form tube 230 can be combined with a scent material, or the interior surface can be coated with a scented material (such as an oil coating) that is picked up and distributed by the airflow. As an optional addition, a scent carrier 90 can be installed at outlet 208. This scent carrier can be refilled or recharged without removing the carrier from game call 202.

As described above, scent carrier 90 used with game call 202 can be a porous packet of loose powder; a wetted sponge, a wetted cloth, a wetted mass of fibrous material that holds a liquid-based scent material such as a scent oil; a scented material that readily sublimates or evaporates when repeatedly brought into contact with human exhalation, or a scent-impregnated solid such as a scent-impregnated polymer or wax that releases the scent in response to human exhalation. Carrier 90 can be a commercially available type and may be of a rigid and porous paper base pad which has been previously impregnated with oils of the particular fragrance or scent material. These scent carriers 90 are configured to release the scent or fragrance in response to a low flow, relatively warm, and relatively moist human exhalation. Thus, a high flow rate of air nor a high temperature is needed to add the scent to the exhalation.

Scent carrier 90 also can be a solid disc-shaped body with a plurality of openings (FIG. 12) to allow for the passage of exhaled or blown breath and to increase the surface area of carrier for contact with the breath. The body of carrier 90 defines a plurality of openings and the outer perimeter edge of the body defines a series of channels that define air paths between the outer perimeter edge of carrier and the inner surface of the sidewall. Carrier is a semi-permeable solid that is soaked in a scented liquid (such as a scented oil) or is formed from a polymer impregnated blended with a fragrance or a scented material. Carrier can be a moldable polymer that is impregnated with the scent. U.S. Pat. Nos. 4,802,626, 4,598,006, 4,095,031, and 3,553,296 are incorporated herein by reference as an exemplary method for forming a scented solid. The user of the call can replace carrier 90 as needed. The user can replace carrier 90 when the scent has been depleted or when the user wishes to change the scent.

In the configuration of FIG. 26, body 204 is provided in first and second separable portions with the first mouthpiece portion carrying filter 220, one-way valve 222, and scent carrier 90. The second portion carries reed 210. The portions can be threaded together, snap fit together, or friction fit together. These are all removable and replaceable. The second reed portion can be swapped out to allow the sound to be changed while using the same first portion. Alternatively, the first portion can be swapped out to change the scent or replenish the scent. As above, reed 210 can be adjustable. The second portion that carries reed 210 can be infused with scent or the inner surface can be coated with a scent material.

The device 202 configuration of FIG. 27 combines a game call with an electric liquid scent material vaporizer to allow the user to create a game call and distribute an electrically vaporized liquid scent material from a single device. The game call can be a traditional game call device or one that distributes scent when used. These can create any of the sounds described above. The exemplary configuration of device 202 includes body 204 with an airflow inlet 206. Filter 220 is used when device 202 is designed for breath. Filter 220 can be removed when the airflow is provided by a squeeze bladder. A valve 240 can be manipulated to direct the airflow to a game call body portion with one-way valve 222, scent carrier 90, reed 210, and, optionally, scent infused tube 230. Turning valve 240 the other way directs the airflow through a one-way valve to a switch 132 or airflow sensor 133 to activate a burner 130 as described above. Valve 240 is manually operable and can be configuration to automatically return to one of the two positions.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the claimed invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A hunting mask wearable by a human hunter over the hunter's mouth and nose; the mask comprising:
   a mask body including at least one inhalation valve that permits inhalation and blocks exhalation;
   the mask body including at least one exhalation valve that permits exhalation and blocks inhalation; the exhalation valve including an exhalation valve member that closes the exhalation valve during inhalation;
   the exhalation valve including an exterior cap;
   a scent material carrier being disposed downstream of the exhalation valve member between the exterior cap and the exhalation valve member; the scent material carrier including a scent material; and
   the scent material carrier being disposed to be contacted by the hunter's exhalation as the hunter's exhaled breath flows out of the exhalation valve member such that the hunter's exhalation combines with the scent material from the scent material carrier and a portion of the scent material exits the mask body in combination with the hunter's exhalation.

2. The device of claim 1, wherein the scent material carrier is a non-powered device that releases the scent material in response to the user's exhaled breath.

3. The device of claim 1, wherein the scent material is one of a masking scent, a cover scent, an aromatic scent, and a repellant scent.

4. The device of claim 1, further comprising a filter carried by the mask body upstream of the scent material carrier.

5. The device of claim 4, wherein the filter includes activated carbon.

6. The device of claim 1, wherein the scent material carrier is one of a porous packet of loose powder.

7. The device of claim 1, wherein the scent material carrier is one of a wetted sponge that holds a liquid-based scent material, a wetted cloth that holds a liquid-based scent material, and a wetted mass of fibrous material that holds a liquid-based scent material.

8. The device of claim 1, wherein the scent material carrier has a solid disc-shaped body provided with a plurality of openings to allow for the passage of exhaled breath and to increase the surface area of the scent material carrier for contact with the exhaled breath.

9. The device of claim 1, wherein the scent material carrier defines a plurality of openings.

10. The device of claim 1, wherein the scent material carrier is a semi-permeable solid that is soaked in a scented liquid.

11. The device of claim 1, wherein the scent material carrier is formed from a polymer impregnated blended with a scent material.

12. A hunting mask wearable by a human hunter over the hunter's mouth and nose; the mask comprising:
- a mask body including at least one inhalation valve that permits inhalation and blocks exhalation;
- the mask body including at least one exhalation valve that permits exhalation and blocks inhalation; the exhalation valve including an exhalation valve member that closes the exhalation valve during inhalation;
- a scent material carrier being disposed downstream of the exhalation valve member; the scent material carrier including a scent material;
- the scent material carrier being disposed to be contacted by the hunter's exhalation as the hunter's exhaled breath flows out of the exhalation valve member such that the hunter's exhalation combines with the scent material from the scent material carrier and a portion of the scent material exits the mask body in combination with the hunter's exhalation;
- wherein the scent material carrier defines a plurality of openings; and
- wherein an outer perimeter edge of the scent material carrier defines a plurality of channels that define air paths between the scent material carrier and the mask body.

13. A hunting mask wearable by a human hunter over the hunter's mouth and nose; the mask comprising:
- a mask body including at least one inhalation valve that permits inhalation and blocks exhalation;
- the mask body including an exhalation valve that permits exhalation and blocks inhalation; the exhalation valve including an exhalation valve member that closes the exhalation valve during inhalation;
- a scent material carrier being carried by the exhalation valve; the scent material carrier being disposed downstream of the exhalation valve member;
- the scent material carrier including a scent material;
- the scent material carrier defining a plurality of openings; and
- the scent material carrier being disposed to be contacted by the hunter's exhalation as the hunter's exhaled breath flows out of the exhalation valve member such that the hunter's exhalation combines with the scent material from the scent material carrier and a portion of the scent material exits the mask body in combination with the hunter's exhalation.

14. The device of claim 13, wherein an outer perimeter edge of the scent material carrier defines a plurality of channels that define air paths between the scent material carrier and the exhalation valve.

15. The device of claim 13, wherein the scent material carrier is a non-powered device that releases the scent material in response to the user's exhaled breath.

16. The device of claim 13, wherein the scent material is one of a masking scent, a cover scent, an aromatic scent, and a repellant scent.

17. The device of claim 13, further comprising a filter carried by the mask body upstream of the scent material carrier.

18. The device of claim 17, wherein the filter includes activated carbon.

* * * * *